US010663351B2

(12) United States Patent
Berz

(10) Patent No.: US 10,663,351 B2
(45) Date of Patent: May 26, 2020

(54) THREE-DIMENSIONAL INTERFEROMETER AND METHOD FOR DETERMINING A PHASE OF AN ELECTRIC FIELD

(71) Applicant: Martin Berz, Munich (DE)

(72) Inventor: Martin Berz, Munich (DE)

( * ) Notice: Subject to any disclaimer, the term of this patent is extended or adjusted under 35 U.S.C. 154(b) by 0 days.

(21) Appl. No.: 16/080,927

(22) PCT Filed: Feb. 17, 2017

(86) PCT No.: PCT/EP2017/053623
§ 371 (c)(1),
(2) Date: Aug. 29, 2018

(87) PCT Pub. No.: WO2017/144364
PCT Pub. Date: Aug. 31, 2017

(65) Prior Publication Data
US 2019/0145831 A1    May 16, 2019

(30) Foreign Application Priority Data
Feb. 24, 2016   (DE) .......................... 10 2016 103 295

(51) Int. Cl.
*G01B 9/02* (2006.01)
*G01J 9/02* (2006.01)

(52) U.S. Cl.
CPC ........ *G01J 9/0246* (2013.01); *G01B 9/02041* (2013.01); *G01B 9/02097* (2013.01); *G01B 9/02098* (2013.01); *G01J 9/02* (2013.01)

(58) Field of Classification Search
CPC ................. G01J 9/02; G01J 2009/0273; G01J 2009/0276; G01B 9/02041; G01B 9/02097; G01B 9/02098; G01B 2290/10
See application file for complete search history.

(56) References Cited

U.S. PATENT DOCUMENTS 6,310,679 B1 * 10/2001 Shiraishi ............. G03F 7/70258
355/53
7,499,174 B2 * 3/2009 Farah ..................... G01B 11/00
356/450

(Continued)

FOREIGN PATENT DOCUMENTS

| DE | 198 09 055 A1 | 9/1999 |
| DE | 69512640 A1 | 4/2000 |
| DE | 102014111979 A1 | 2/2015 |

OTHER PUBLICATIONS

Pedrini et al., "Digital holography of self-luminous objects by using a Mach-Zehnder setup" Optics Letters, Feb. 15, 2012, vol. 37, No. 4, pp. 713-715.

(Continued)

*Primary Examiner* — Jonathan M Hansen
(74) *Attorney, Agent, or Firm* — McAndrews, Held & Malloy, Ltd.

(57) ABSTRACT

A three-dimensional interferometer for measuring a light field produced by an object, comprising a first interferometer arm, a second interferometer arm, a beam splitter arranged between an object point of the object and the first interferometer arm and the second interferometer arm, and is set up to split a beam coming from the object point at the beam splitter into the first beam and the second beam, a detection plane or a detection surface which is arranged downstream of the first interferometer arm and the second interferometer arm and is set up in such a manner that the first beam and the second beam are made to interfere in an interference region on said plane or surface, and an overlapping device which is arranged between the detection plane and the first interferometer arm and the second interferometer arm.

13 Claims, 9 Drawing Sheets

(56) References Cited

U.S. PATENT DOCUMENTS 10,386,174 B2 * 8/2019 Berz .................... G01J 3/45
2004/0033426 A1 2/2004 Den Boef

OTHER PUBLICATIONS

Office action corresponding to German Patent Application. 102016103295.6, dated Oct. 27, 2016.

* cited by examiner

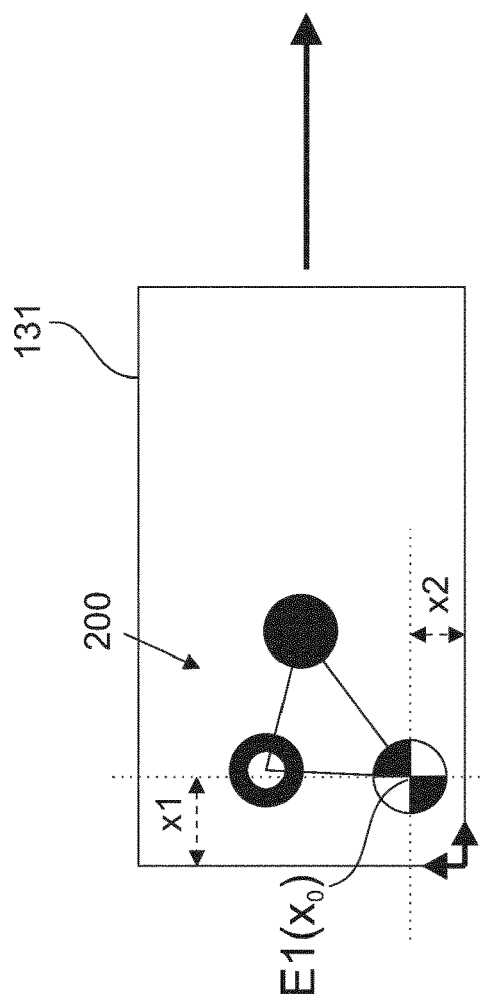
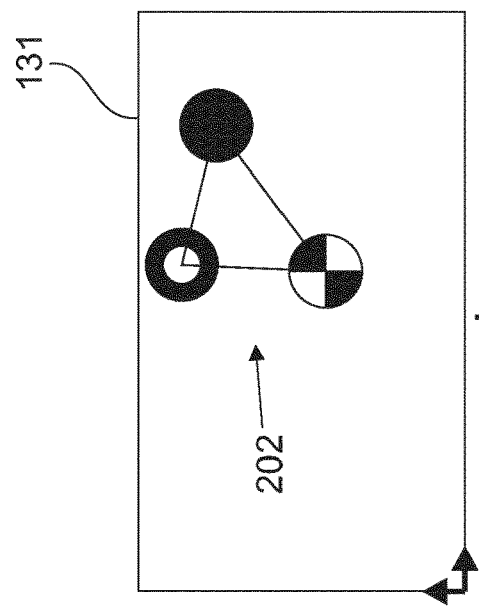
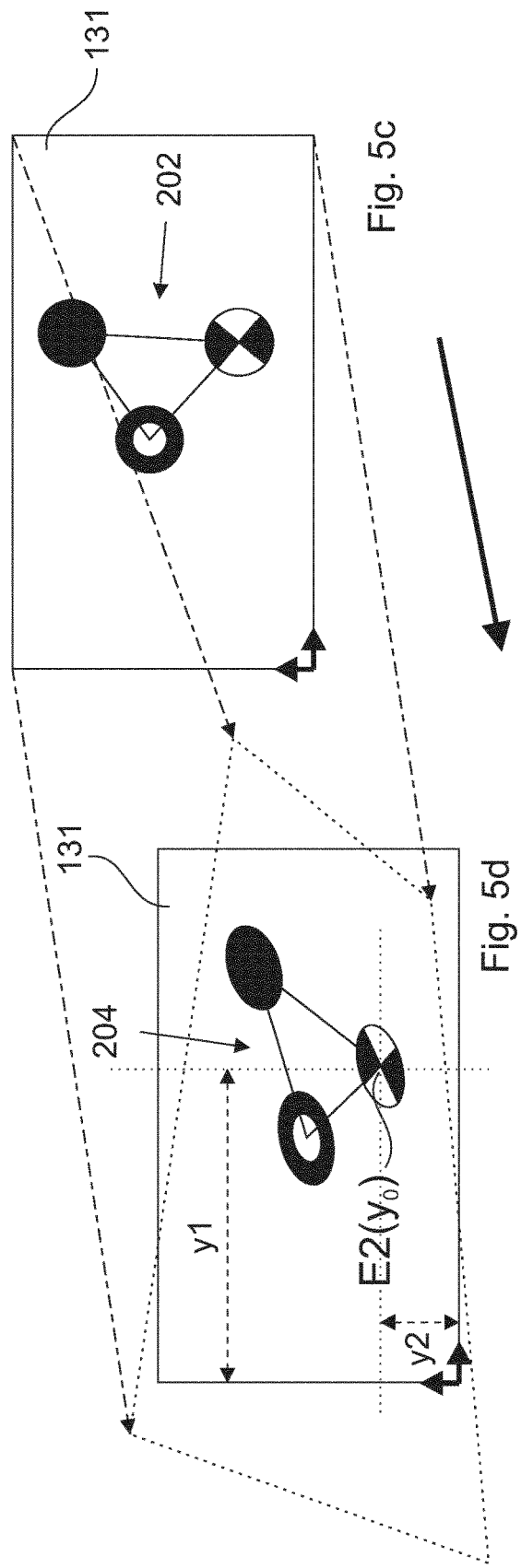

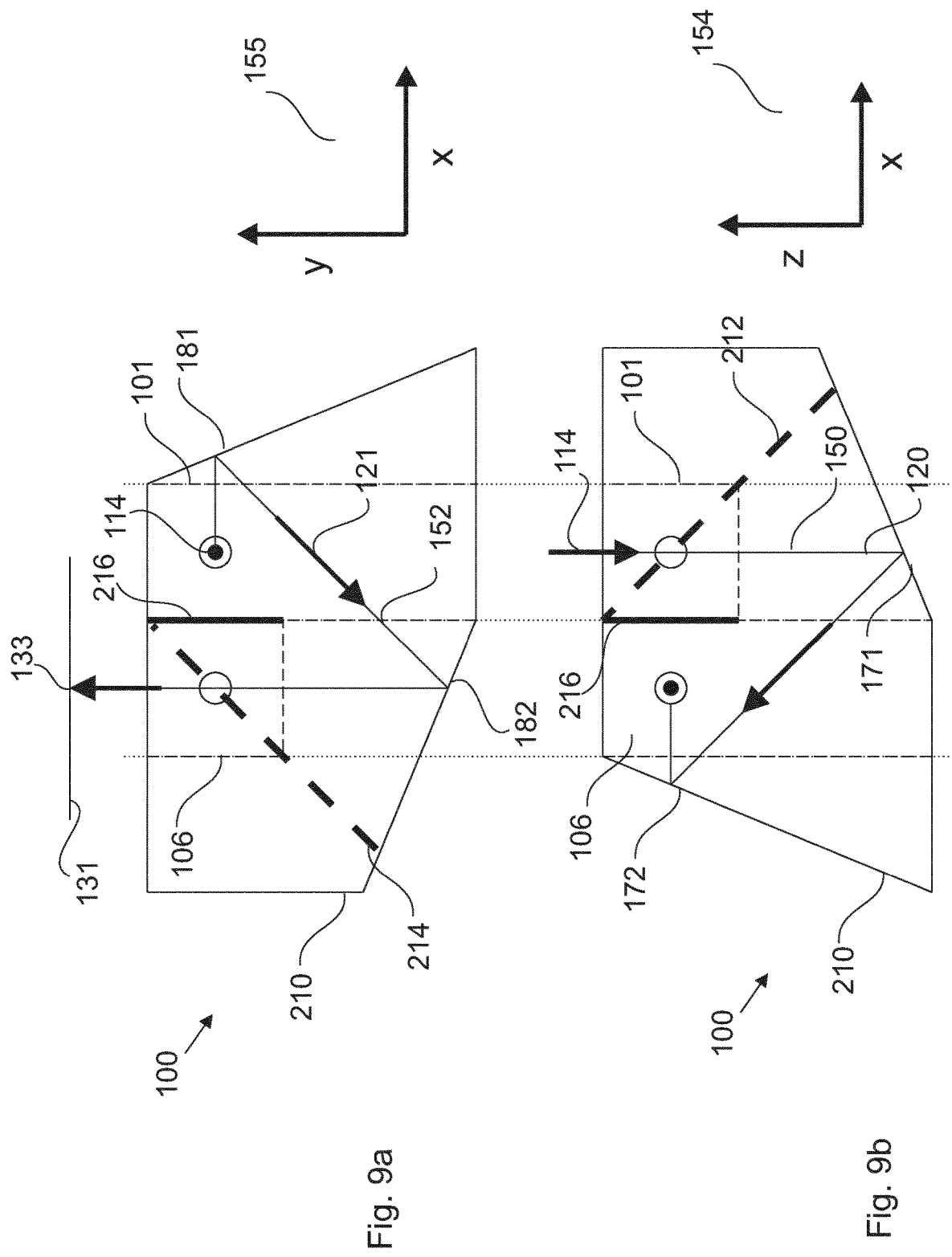

THREE-DIMENSIONAL INTERFEROMETER AND METHOD FOR DETERMINING A PHASE OF AN ELECTRIC FIELD

The invention relates to a three-dimensional interferometer, a method for determining a phase difference at at least one point in an interference area of the three-dimensional interferometer, a method for determining a phase of an electrical field in a part of the interference area of the three-dimensional interferometer as well as a computer program and a computer program product for performing the method mentioned.

Interferometers can be distinguished by their spatial arrangement. Normal interferometers, such as the Mach-Zehnder, Michelson, or Sagnac, are two-dimensional interferometers. A boundary between two and three-dimensional interferometers is given in the general description part.

Holography is also well-known in prior technology. Holography is an interferometric technology, which allows the amplitude and phase information of a wave front to be stored, reconstructed and measured. The result of applying this technology is called a hologram. In digital holography, the hologram is stored digitally. A holographic camera is a device for recording holograms. Within the framework of the existing application, a holographic camera is understood to be a device that measures the phase or the phase and amplitude for an incident field, especially a light field.

Holographic measuring systems used to measure the amplitude and phase of a light field are also well-known in prior technology. The usual structure for holography consists of a light source, a beam splitter that divides the light into a reference ray and an object ray, wherein the object ray is directed at the object to be measured, reflected/scattered there and then brought to interference with the reference ray. A prerequisite for this technology is the existence of a real object, i.e. the object to be imaged may not be a virtual object.

Another example of a local phase measurement is the Twyman-Green interferometer, a special type of the Michelson interferometer. The Twyman-Green interferometer is a two-dimensional interferometer in which one of the interferometer arms contains the object to be examined, e.g. a lens, a prism or a surface. The local measurement therefore does not relate to the input field but is a property of the interferometer. It therefore does not concern a local measurement of an input field here. The interferogram contains information about the spatial surface properties of the object to be examined. It is characteristic that the object to be examined is part of the interferometer. In an alternative view of the function, coherent light is reflected at the object to be examined which is brought to interference with a test ray that is generated via the other arm of the Michelson interferometer. The object to be examined in this representation is also part of the interferometer structure and must therefore satisfy stringent criteria of mechanical stability, freedom from dust, and general reproducibility. The Twyman-Green interferometer is therefore not an interferometer for local phase measurement of the input field.

The Twyman-Green interferometer can be understood as a holographic measuring system in which one of the arms of the Michelson interferometer is used to generate the reference ray. The overlapping of the reference ray and the object ray takes place in the Twyman-Green interferometer via the same beam splitter that has also been used for the splitting into object and reference rays.

Both the Twyman-Green interferometer and the holographic measuring system use a reference ray. A reference ray assumes that is possible to decouple light from the light source before it reaches the object. The spatial constellation of light source, object and measuring device therefore must be suitably set up—otherwise the measurement cannot be performed. This type of provision of a reference ray is called external reference ray provision.

A three-dimensional interferometer is known from the subsequently published German Patent Application with the file reference DE 10 2014 111 979.7, in which the light ray emanating from the object point in the direction of the device is measured in terms of its wave vector for each point of the object to be imaged. The method used there assumes that the light from different object points is mutually incoherent, i.e. that there is no interference between light from different object points and therefore a coherence only exists between different light rays that emanate from the same object point. With that, the spatial angles of the local position of the individual object points are measured, without the wave front or a comparable quantity being measured. The reason is that the overlapping of incoherent sources (object points) produces a radiation field that has no defined local phase and therefore also no wave front. A wave front is understood here as points with the same phase position in a radiation field. The device is therefore not suitable for interferometric analysis of a wave front or as a holographic camera. The interferometer revealed in DE 10 2014 111 979.7 has neither an evaluation unit nor a computer program product.

It is an object of the present invention to indicate a three-dimensional interferometer or a three-dimensional device which allows an interferometric determination of the local phase of an incident wave. Here, this determination is to be made with high resolution.

The three-dimensional interferometer is to solve this task by means of a simple, especially compact, structure. The interferometer shall also be cost-effective in its manufacture.

A further object of the invention is to indicate a method that determines a phase difference between a first electrical field which originates from the first interference arm and a second electrical field originating from the second interference arm by using the three-dimensional interferometer for at least one point of an interference area of the three-dimensional interferometer.

A further object of the invention is to indicate a method which, by the use of the three-dimensional interferometer, determines a phase of an electrical field in a part of the interference area of the three-dimensional interferometer.

A further object of the invention is to indicate a method that determines an amplitude of an interference term or the amplitude of a first or second electrical field originating from the light field running through the first or second interferometer arm by using the three-dimensional interferometer for at least one point of an interference area of the three-dimensional interferometer.

A further object of the invention is a computer program and a computer program product for performing the said method.

An object of the invention is achieved by a three-dimensional interferometer for the measurement of a light field produced by an object.

To physically describe correctly the three-dimensional interferometer of the following description, it is necessary to propagate the incident light field or electrical field propagating onto the interferometer according to the general physical equations, e.g. the diffraction formulae of Huygens, Rayleigh or Sommerfeld, through the interferometer, i.e. both through the first interferometer arm and through the second interferometer arm up to the detection plane in order to then calculate a superposition of the two fields on the detection plane. It is however possible to characterize the invention-related interferometer via light fields that satisfy those of the geometrical approximation.

The geometrical optics, also called ray optics, are to be mathematically understood as a limiting case in the wave optics for infinitesimally small wavelengths of light. This approximation applies in the present case when the wavelengths used are small relative to the dimensions of the components used in the interferometer.

There is a central beam for any object point. The invention-related interferometer is however characterized in the main claim on the basis of a single central ray. The central ray depends on the selection of the object point and of the detection plane.

The interferometer serves to measure a light field produced by an object. This means especially that at least one quantity of an electrical field is determined. A phase of the electrical field is the main focus here. A phase and an intensity or an amplitude of the electrical field can however also be determined. The interferometer is especially suitable for determining a quantity of an electrical field, be it a phase or a phase and an intensity of the electrical field. The electrical field or the relative intensity can be determined here, i.e. compared with a specified quantity. In this case, an absolute value of the electrical field or of the intensity is not known. Determination of an absolute value of the electrical field or of the intensity is preferred.

A wave front can be understood as points with the same phase during the propagation of a wave. The term "measuring a wave front" can be used here as a synonym for measurement of phase on a plane, wherein the plane may not be collinear to the propagation direction, as the points with the same phase would be meaningless for such a plane.

The interferometer has a first interferometer arm, a second interferometer arm, a beam splitter, a detection plane, and an overlapping device.

The light of the light field to be measured is at least partly or partially coherent. The light is especially preferred coherent light.

The term "partial coherent light" is to be understood in relation to the selected measuring situation which means in the case of coherent light that all wave fractions that overlap are mutually coherent, i.e. there is a temporally fixed relative phase position. In the case of partially coherent light, there are overlaps that do not have a temporally, fixed phase relationship to each other. This occurs when the difference in path lengths of the interfering fields is longer than the coherence length. Due to a change in the path difference between the arms of the interferometer, it is possible to move the two overlapping fields more or less into the coherence area.

It is especially the case that a wavefront can still be regarded as a coherent light field in a particular interferometer structure, while it must be regarded as a partially coherent light source in a different interferometer structure. The original difference in interferometer structure for this purpose is whether the path length differences between the two interferometer arms are longer or shorter than the coherence length of the light source. The coherence length is a property of a light source or of a light field.

The path length differences that occur in the invention-related interferometer set-up, as measured for rays of the beam of the reference point, are preferably shorter than the coherence length of the incident light field.

The first interferometer arm can be so configured or adjusted that a first beam passes through it. The second interferometer arm can be so set up or adjusted that a second beam passes through it. Preferably, the first interferometer arm is set up so that a first beam runs through it. Preferably, the second interferometer arm is setup so that a second beam runs through it. Herein, the term that a beam runs through an interferometer arm or through a device is preferably understood as none of the rays of the beam being blocked or vignetted by an obstacle. It is preferred that no beam is vignetted in the interferometer. The term "beam" used here relates to the description method of the interferometer within the meaning of the main claim. A beam, as described in connection with the invention-related method in the latter section of this application, can also be generally blocked or vignetted by an obstacle just like a beam actually used in the interferometer.

It is preferred that the second interferometer arm between the beam splitter and the overlap device differs from the first interferometer arm at each point.

The beam splitter is arranged between an object point of the object on the one hand, and the first interferometer arm and the second interferometer arm on the other hand. Herein, the beam splitter is so configured that a beam leaving the object point is split at the beam splitter into the first beam and the second beam. The beam splitter has the function of dividing the light field coming from the object or the beam coming from the object point into two light fields or beams, which then run through the two interferometer arms and are so combined at the overlap device that the two light fields or beams come together in interference in the interference area of the detection plane. The light field is measured in the interferometer by amplitude splitting; wavefront splitting relating to the central ray does not take place.

The beam splitter can also have a diffractive optical element (DOE), especially a grid, or consist of such. A DOE can for example act as a beam splitter, if the incident ray onto the DOE is diffracted into the first and minus-first order and the zero order is virtually suppressed or not used. Preferably, the intensities in the first and minus-first order are approximately equal, herein.

To be able to measure an interference, the optical path length difference between the two interferometer arms must be smaller than the corresponding coherence length of the beam used.

"Optical path length" is understood as the integral of the refractive index along the path taken by the ray. If the refractive index along this path is constant, the optical path length equals the product of the refractive index and the distance of the path taken.

The object can be either a real or a virtual object.

The object point can be any point of the object. In order to describe the invention-related interferometer in accordance with the main claim, a particular object point is selected without loss of generality, also referred to as the reference point. The reference point is so selected that it lies in the field of view, preferably in the middle of the field of view.

The detection plane is arranged according to the first interferometer arm and the second interferometer arm. The detection plane is to be configured or adjusted, preferably configured, so that the first beam and the second beam are brought to interference in an interference area on it. Here, the interference area is a sub-region of the detection plane. Preferred is also that the interference area can be identical with the detection plane. Preferred is the overlap of the detection plane area illuminated by the first beam and the area of the detection plane illuminated by the second beam is as large as possible; preferred is that the area illuminated by the first beam is identical with that illuminated by the second beam. The greater the overlap of the two beams on the detection plane, the more information is received about the interference of the two beams.

The interference area is the area of the detection plane in which the first beam and the second beam overlap. Therefore, there is an area on the detection plane, which is struck by the first beam but not by the second beam and there is a further area on the detection plane which is struck by the second beam but not by the first beam.

The flat detection plane is preferred. The detection plane can however be replaced by a detection surface in accordance with another embodiment—the surface being curved, not flat.

The overlap device is arranged between the detection plane on the one hand and the first interferometer arm and the second interferometer arm on the other hand.

Preferred are the beam splitter and overlap device as two separate items of equipment.

The overlap device is not a reversal of the beam splitter. This can be seen in that an incident light ray failing on the beam splitter is split into two light rays directly after the beam splitter; however, two light rays incident on the overlap device do not, as a rule, combine to form a single light ray directly after the overlap device. Rather, the overlap device serves the purpose that two incident light rays falling on it or, more generally stated, of deflecting light fields or beams so that these are brought to interference in the interference area of the detection plane.

It has been stated that two light rays falling on the overlap device do not form a single light ray directly after the overlap device as a rule. There is however an exception for the case that the central ray is emitted by a central object point. If there is a position of an object point at which an equality of the light beam falling on the detection plane is reached, this point is called the central object point. It can be shown that the central object point is unique. It does not however have to lie in the field of view of the invention-related interferometer. The central object point is defined as a point, for which the central ray emanating from this point produces a first and a second central ray after the overlap device that have the same propagation direction, i.e. they superpose.

The overlap device can for example have a DOE. Here, the DOE can be used in reverse to the normal ray guidance. For example, the first and minus-first diffraction order can be used as the two rays to be combined and a typically incident ray can be used as the combined exit ray. Herein it has to be observed, however, that because of the asymmetry between the beam splitter and overlap device, the beam splitter and the overlap device cannot generally use the same DOE.

A beam is to be understood in the existing application—according to geometrical optics—as a number of rays emanating from one point, especially the object point. Preferred is that the beam, seen from this point, has a small opening angle, which is less than 5°. Further preferred values are 2°, 1°, 0.5° and 0.1°.

This definition applies solely to the beam which is to be applied to the description of the interferometer according to the main claim and according to the alternative formulation.

For the explanation of the present main claim, only such beams are to be considered that emanate from a selected point, for example the reference point, and meet on the detection plane for the selected object point. This does not represent a constraint; a reference point without constraint and a sufficiently small light beam can be selected so that this always applies. It is to be noted, for example, that the beam emanating from the object point, due to imaging errors, no longer has the property that the rays of the beam emanate from a point after the propagation or reflection at the ray deflection elements. Despite this, these rays as a whole should be referred to as a beam.

In addition, the beam splitter, the first interferometer arm, the second interferometer arm, the overlap device, and the detection plane are to be configurable or adjustable, preferably configured for the following conditions to be satisfied. These conditions listed below are constraints for the mutual positioning of the beam splitter, the first interferometer arm, the second interferometer arm, the overlap device, and the detection plane. This means that each of the following conditions is an equipment feature.

The first condition is that the beam splitter, the first interferometer arm, the second interferometer arm, the overlap device, and the detection plane can be configured or adjusted, preferably configured, so that there is exactly one central ray relating to an object point of the object, emanating from the object point that is split at the beam splitter into a first central ray and a second central ray. Here, the central ray is part of the beam, the first central ray is part of the first beam and runs through the first interferometer arm, and the second central ray is part of the second beam and runs through the second interferometer arm. In addition, the first central ray and the second central ray overlap on the interference area of the detection plane in a central image point.

Within the given object point and the given position of the detection plane, each beam emanating from this object point has a clearly defined central ray that can be found as follows: a search was made for that light ray of the beam that is split at the first beam splitter into the first central ray and the second central ray and they overlap after the overlap device in a point in the interference area on the detection plane.

The term "overlapping of two light rays" is so defined that two light rays overlap when they coincide in a common point, however the direction of the individual light rays does not have to be, but can be, identical. It can therefore also be said that the directions have no relevance in the overlapping of two light rays. The term "superposing of two light rays" is a special case of overlapping in that the two light rays pass through a common point and the particular propagation directions are identical at this common point. A consequence of this is that two mutually superimposing light rays also overlap. However, it does not apply that two mutually overlapping light rays also superimpose in each case.

The central ray and therefore the central image point can be found experimentally as follows. The initial situation is that the object point selected for the construction sends out a beam. This beam is restricted to a part-beam by a movable aperture, e.g. a pinhole aperture, (or the equivalent optical "mark", "obstacle", "screen") in the ray passage between object point and both interferometer arms. The part-beam leads, via the first interferometer arm and the second interferometer arm, to a partial illumination of the detection plane, i.e. to restriction of the illumination in the overlap area of the unrestricted beam. If the restricted beam still contains the central ray, there is still an overlap—despite the restriction. If the restricted beam no longer contains the central ray, there is no longer an overlap of the partial beam, if possible diffraction effects at the aperture are neglected. With further movement of the aperture, it is possible to get the central ray in the aperture and it comes to an overlap.

This means that the positions of the central ray and the central image point are experimentally determined.

It is to be emphasized again that the position of the central ray depends on the object point selected. It is also emphasized that the selection of the object point leads to a distinct characterization of the inventive interferometer. A different selection of the object point leads to a different distinct characterization of the interferometer according to the invention.

In the following, two-dimensional interferometers should be separated from three-dimensional interferometers. As interferometers with two interferometer arms are to be considered, one-dimensional interferometers, the Fabry-Pérot for example, are not considered. This means that when interferometers with two interferometer arms are being discussed, only interferometers that are two-dimensional or three-dimensional are meant.

In the present application, two definitions of two-dimensional interferometers are given. Interferometers not covered by these two definitions are regarded as three-dimensional interferometers.

According to the first definition, the centers of the elements—especially of the ray deflection elements—of a two-dimensional interferometer are arranged in one plane.

In this, a beam splitter or an overlap device is also regarded as a ray deflection element.

According to the second definition, an interferometer is considered a two-dimensional interferometer when there is a reference point, for which a first plane or incident plane, which is defined by the first and second central ray immediately after the beam splitter, is identical with a second plane or exit plane, which is defined by the first and second central ray immediately before the overlap device.

All interferometers that are covered by the above-mentioned definitions are regarded as two-dimensional interferometers. All other interferometers are therefore regarded as three-dimensional interferometers.

The approximation used to describe the invention-related interferometer can be described more precisely at this point. Instead of a propagating a complicated light field through the interferometer according to Huygen's principle, the following approximations have been made. An idealized light field is used, which emanates from a selected reference point. It has been shown that, for a given reference point and a given detection plane, the central image point and the central ray, i.e. also the first central ray and the second central ray, are uniquely defined.

A scalar theory is also used, especially the scalar deflection theory, for which the Helmholtz optical equation applies, i.e. polarization effects are not considered. This procedure is correct for unpolarized light as well as for cases when only one polarization exists, if the interferometer does not rotate the polarization between the first electrical field on the detection plane and the second electrical field on the detection plane. This is the preferred configuration and can, if it does not already exist, be brought about by using a polarizing-rotational element in the ray passage of the first or second interferometer arm.

Under these conditions, it is now possible to propagate the first electrical field on the detection plane along the first central ray back to the beam splitter and then forward again along the second central ray up to the detection plane, in order to obtain the second electrical field. In this approximation, it is possible for a given geometry, i.e. for a given interferometer structure, to calculate the second electrical field on the detection plane from a given first electrical field on the detection plane. With given first and second fields, it is also possible to calculate how the two electrical fields mutually transform into each other.

In the case of a selected reference point, the electrical field propagated through the first interferometer arm can be called E1 at the image point BP1, for each image point BP1 of the interference area. In the geometric approximation, the field E1 touches at the point BP1 of the light ray that runs from the reference point to BP1. The part of this light ray before the beam splitter is split at the beam splitter into two rays, of which the first light ray runs via the first interferometer arm up to the point BP1 and of which the second light ray runs through the second interferometer arm reaching the detection plane at another image point, called BP2. The second light ray generates the field E2 at the point BP2. Apart from the differences in path lengths and within the framework of the geometrical approximation, the field Feld E1 at the point BP1 and the field E2 at the point BP2 are identical as the fields originate from the same part-ray before the beam splitter. If the approximation to the paraxial optics, also Gaussian optics or optics of the first order, is applied to the optical elements in the interferometer, the image of the arbitrarily selected point BP1 in the interference area can be an image onto the BP2 point, which is a clear function of the point BP1—a projective mapping in the most general case. The projective mapping can especially be an affine image.

A projective mapping P in two dimensions is defined here as follows.

Each point in the origin space and in the image space is given by two coordinates x, y and x', y'. For the purposes of projective mapping, each pair is supplemented with a 1 as the third component, i.e. a vector with three components (x,y,1) or (x',y',1) corresponds to each point.

All points that result from multiplication by a number $\lambda$, are taken to be equivalent, i.e. (x,y,1) is equivalent to ($\lambda$x,$\lambda$y,$\lambda$).

Each three-dimensional vector can be brought into a form where the third component is 1 and so that the x,y value can be read out in a two-dimensional coordinate system.

The projective mapping P is, seen mathematically, an image of the three-dimensional space into the three-dimensional space. As an image is considered, however, in two dimensions, the two-dimensional point (x,y) is supplemented by the third coordinate with 1 so that it can be written as follows: (x,y,1). In conclusion, the 3×3 matrix P is applied and brings the result into the form (x',y',1) again. The coordinate pair (x',y') is the result of the projective mapping. The transformed coordinates can therefore be written as:

$$x'=(p11x+p12y+p13)/(p31x+p32y+p33)$$

$$y'=(p21x+p22y+p23)/(p31x+p32y+p33)$$

wherein $p_{ij}$ (i and j are numbers from 1 to 3) are the 3×3, therefore a total of 9 indices of the matrix P. See also Born/Wolf, Principles of Optics, Cambridge University Press, 7th edition, Chapter 4.3.1 on this.

The second condition is that the beam splitter, the first interferometer arm, the second interferometer arm, the overlap device, and the detection plane can be so configured or adjusted, preferably so configured that for each light ray which leaves the object point of the object and is a part of the beam but is not the central ray, there is a first light ray running through the first interferometer arm and a second light ray running through the second interferometer arm, which are split off from the light ray at the beam splitter and which strike the detection plane at different points. Here, the first light ray is part of the first beam and the second light ray is part of the second beam.

It should be noted here that the first light ray and the second light ray do not strike the interference area in every case. There are, in addition, cases in which either the first light ray or the second light ray do not strike within the interference area.

According to an embodiment of the interferometer, this has at least two different points on the detection plane mentioned in the second condition whose mutual distance is greater than 1/1000, preferably 1/100 and even more preferred 1/10 of the largest expansion of the detection part of the detection plane or of the detector. The interferometer preferably has an infinite number of such points.

For the case that the interferometer has a detector which is divided into pixels in the detection plane, the interferometer has at least two different points in the detection plane, as mentioned in the second condition, whose mutual distance is greater than 1 pixel, preferably 10 pixels and even more preferably 100 pixels of the detector expansion.

According to an embodiment of the interferometer, 1% of all points of the interference region have this property. Preferred is that 5% of all points of the interference region have this property. Further preferred values are 10%, 25% and 50% of the points of the interference region. If the detection plane has a pixel grid, this condition can be applied analogously to the number of pixels.

The second condition is defined for each light ray which leaves the object point of the object and is a part of the beam but not of the central ray. The light rays so described are generally an infinite number that strike the detection plane at an infinitely large number of points. Here, the first light ray strikes the detection plane at an infinitely large number of points and the second light ray also strikes the detection plane at an infinitely large number of points.

Due to the second condition, an assignment is laid down for each light ray that is split into the first and second light rays at the beam splitter, which assigns a second point on the detection plane, which is struck by the second light ray to a first point on the detection plane, which is struck by a first light ray. This results in a mapping of an infinite number of first points each of which is struck by a first light ray, to an infinite number of second points, each of which is struck by a second light ray. This mapping is a bijective, i.e. a clearly reversible mapping, of the first area of the detection plane onto a second area of the detection plane. This bijective mapping is explained below in more detail within the context of an alternative formulation of the main application.

The third condition is that the beam splitter, the first interferometer arm, the second interferometer arm, the overlap device, and the detection plane can be so configured or adjusted, preferably so configured that there is exactly a third light ray which emanates from the object point, is not the central ray, runs through the first interferometer arm and strikes the image point on the detection plane and there is exactly a fourth light ray which emanates from the object point, is not the third light ray before the beam splitter, is not the central ray, runs through the second interferometer arm and overlaps with the third light ray at the image point on the detection plane The third light ray and the fourth light ray are part of the beam before the beam splitter. In the first interferometer arm, the third light ray is part of the first light beam. In the second interferometer arm, the fourth light ray is part of the second light beam.

The positions of the third and fourth light rays depend on the choice of object point or reference point.

The object of the main claim of the present invention described above can also be described by an alternative formulation. This alternative formulation is more easily understood than the first formulation presented above. As it is however not yet clear which formulation is more general, the alternative formulation shall also be presented here and both shall be initially regarded as equivalent.

The interferometer according to the alternative formulation is described below. To distinguish the interferometer according to the alternative formulation from the initial interferometer description, the former will be named the alternative interferometer and the latter as the first or first described interferometer.

The alternative interferometer also has, as with the first interferometer, a second interferometer arm, a beam splitter, a detection plane, and an overlap device.

The features of the alternative interferometer match those of the first-described interferometer except for the description of the mutual positioning of the beam splitter, of the first interferometer arm, of the second interferometer arm, of the overlap device and of the detection plane. These features have been formulated as three conditions within the framework of the first-described interferometer. The alternative representation for the entirety of these three conditions is given below.

With the alternative interferometer, the beam splitter, the first interferometer arm, the second interferometer arm, the overlap device and the detection plane are configurable or adjustable, preferably so configured that a first electrical field that originates from the first beam on the detection plane and a second electrical field that originates from the second beam on the detection plane can be mutually transferred by a projective mapping P, wherein the projective mapping P in the interference area has exactly one fixed point, which is called the image point The approximation of the geometrical optics applies to both the description of the first-described interferometer and to the description of the alternative interferometer. For the description of the alternative interferometer, however, the approximation of the Gaussian optics—also called paraxial optics or first-order optics—is additionally required, as otherwise the relationship between the first and second electrical fields cannot be described by a projective mapping.

An object of the invention is achieved in the alternative formulation by an efficient and controlled superposing of two electrical fields that are propagated via the first or second interferometer arm. Here the aim is, with fixed beam diameter, to maximize the interference area on the detection plane, i.e. minimize areas where only one field is present. This can be compared with the task of making a circular disc coincident with itself as far as possible without the same points lying on the same points. This makes it possible to maximize the interference information. The method selected for the invention-related solution is, amongst other things, a rotation of the two radiation fields relative to each other. Such a mapping is characterized by the axis of rotation with which the projective mapping has to have an exact fixed point, in contrast to a pure displacement of the two electrical fields which leads to larger areas where no overlapping can occur. A pure displacement of the two electrical fields relative to each other has no fixed point. A combination of a displacement and a subsequent rotation about a fixed point also has a fixed point.

It can be discerned here that, with the selected technique of a fixed point, larger local differences between the light field through the first and second interferometer arms can be achieved compared with a device without a fixed point.

It is also discernible that several or an infinitely large number of fixed points mean that there the light field through the first and second interferometer arms overlaps at the same receptor point on the wave front, i.e. the associated light ray is split, but brought back again to overlapping with itself. No phase information on the incident light can however be drawn from this, as this signal is independent of the phase position of the observation point, it is only dependent on the path difference.

Summarizing, it can be established that a maximum of interference information is obtained when there is exactly one fixed point.

The projective mapping P is clearly preferred as distinctly reversible, i.e. bijective. This applies at least in a part-area of the detection plane, preferred over the entire detection plane.

The projective mapping P depends on the choice of reference point.

As the true electrical fields, i.e. the first electrical field E1 and the second electrical field E2 at the beam splitter are identical; for the electrical fields on the detection plane, we can write:

$$E_2(x_2) = \gamma \cdot E_1(x_1) \quad (1),$$

wherein the constant, complex factor $\gamma$ takes into account the fact that the attenuation factors in the interferometer arms can be different. If the attenuation factors in the interferometer arms are identical, the value of the factor $\gamma$ is equal to 1. The functions E2 and E1 are complex functions. In the approximation considered here, the electrical fields are not vector fields but scalar fields. This means that the electric field is a complex function which is assigned to a three-dimensional local vector x.

The equation (1) does however not apply for individual values of $x_2$ and $x_1$, but for an infinitely large number of such values. Here, the mapping P: $x_1 \rightarrow x_2$ represents a projective mapping. This can be described as a function as follows:

$$x_2 = P(x_1) \quad (2)$$

The projective mapping has precisely the fixed point $x_{1F}$, in the interference area, i.e. for this point, applies:

$$x_2 = P(x_{1F}) = x_{1F} \quad (3)$$

The projective mapping depends on the selected object point or reference point.

Vignetting effects from the optical components on the ray deflection elements are to be taken into account in a real interferometer, if need be. With the interferometers considered here, it is assumed that the light beam is selected to be so small that no vignetting effects occur at the optical components or the ray deflection elements.

The object of the main claim is very easy to understand in the alternative formulation. The light field or the electric field, depending on how it falls onto the beam splitter, is split into two paths corresponding to the interferometer arms, in order to superpose the two light fields located in the interferometer arms on the detection plane in a controlled manner, in that the two light fields are displaced and rotated relative to each other. Such a transformation is generally a projective mapping. Since the geometric structure of the interferometer is known exactly, it is also known exactly how the two light fields are transformed into each other. This allows the measuring of a light field impinging on the interferometer in a very exact way. The present invention makes it possible to determine absolutely the light field falling on the invention-related interferometer in phase with the exception of an additive constant.

Preferred is that the interferometer has an evaluation unit that is configured to determine or measure a phase difference between the two mutually interfering light rays there and/or a phase of a light ray that strikes there for a least one point of the interference area on the detection plane. Details of the evaluation method within the context of the two invention-related methods are described below. The determination of a phase is generally possible, with the exception of an additive constant.

Preferred is that the evaluation unit is so configured for several points of the interference area that there a phase difference between the two mutually interfering light rays and/or a phase of a light ray that occurs there, can be determined or measured for several points of the interference area.

Alternatively or in addition to the evaluation unit, the interferometer has a computer program product that is stored in a medium that can be used in a computer, including computer-readable program means with which a computer can execute an inventive method described below. The method mentioned is either a method for determining a phase difference at at least one point of an interference area between a first electric field and a second electric field, which interfere at at least one point or a method for determining a phase of an electric field in a part of an interference area on a detection plane.

It is preferred that the interferometer has a detector in the detection plane. The detector is position sensitive. Preferred here is that the detection plane is divided into a large number of pixels, which can be assigned, e.g. to a grid.

Suitable technology for the detection of the ray depends on the radiation under consideration. In the optical range, CCD or CMOS cameras are suitable. Cameras with lock-in function can also be used here. The spatial resolution is preferred as a function of the field of view and to be selected taking the Nyquist-Shannon criterion into consideration so that the phase variation between two evaluation points does not exceed $\pi$. The maximum phase variation is given by the largest angle that can be included by two rays of interfering beams, wherein only rays are to be considered that actually come to interference. This angle is related to the angular range that an interferometer can resolve in the object space. This resolved area should preferably match the field of view, i.e. with the area where radiation can come from the object space onto the detection area. Here, the detection area is the area of the detection plane that is covered by the detector. It is possible, by means of ray-forming optical elements in the beam path of the interferometer or before the interferometer, to adapt a given—especially technically determined—pixel grid of the detector to the desired field of view. Suitable detectors for an invention-related interferometer do not therefore have to fulfill fixed criteria for the location resolution as it is possible to adapt the invention-related interferometer to the detectors. The great freedom available herein in the choice of system, largely independent of aberration and manufacturing deficits, represents a large benefit of the invention-related interferometer.

Preferably, the evaluation unit is connected to the detector, i.e. the measured values delivered by the detector can be queried or read by the evaluation unit. In this case, the evaluation unit calculates the definitive phase difference or phase using the invention-related method and makes this information or measured values available, e.g. to an interface so that a user can read out this information or measured values.

FPGAs (Field Programmable Gate Arrays) are preferred for ultra-fast applications.

According to a different embodiment, which is independent of the presence of an evaluation unit, computer systems with graphics processor (GPU) evaluation modules or microprocessors with one or more cores can be used. For most applications, no particularly high demands are made on the technical equipment for the evaluation unit. The evaluation is even possible using microcomputers, e.g. Raspberry Pi, depending on the selected embodiment option.

Preferred is that the first interferometer arm or the second interferometer arm has at least one ray deflection element between the beam splitter and the overlap device. The beam splitter and the overlap device here are not included in the count. Preferred is that each of the two interferometer arms has one or two ray deflection elements.

A ray deflection element can be defined as a physical object at which an incident light ray can be at least partly deflected. A ray deflection element can, for example, be realized by a mirror or a diffractive optical element (DOE). A beam splitter cube is also a ray deflection element.

According to a further variant, at least one ray deflection element has a diffractive optical element (DOE), especially a grid. A DOE can be implemented using a very light component.

Preferred for the first or second central ray is that the lengths from the beam splitter up to the central image point on the detection plane are equally long. A measure for this length is the optical path along the paths described. An advantage of equal path lengths is that the coherence length of the light used can be lower.

A further advantage lies in a simplified evaluation of the interferograms, as these contain no or lower diffraction terms. The reason for this is that diffraction effects in the forward and backward propagation can compensate so that hereby in suitable cases, only the difference in the path lengths is effective.

Preferably, the beam splitter, the first interferometer arm, the second interferometer arm, the overlap device and the detection plane can be so configured or adjusted, preferably are configured so that the sum of the ray deflections for a fifth light ray that is the central ray before the beam splitter and is the first central ray after the beam splitter, wherein the fifth light ray is only considered between a point immediately before the beam splitter and immediately after the overlap device, and for a sixth light ray that is the central ray before the beam splitter and is the second central ray after the beam splitter, wherein the sixth ray is only considered between a point immediately before the beam splitter and immediately after the overlap device, is equal to 5, 6 or 7.

Herein, care is to be taken that the number of ray deflections means the number, that both central rays experience in total within the interferometer. For this, the beam splitter and the overlap device are included in the count. If only a single ray is deflected in the beam splitter or the overlap device while the other ray is not deflected, a ray deflection will be counted for the particular element. If a deflection takes place at the beam splitter both between the incident light ray onto the beam splitter and the light ray in the first interferometer arm directly after the beam splitter as also between the incident light ray and the light ray in the second interferometer arm directly after the beam splitter, two ray deflections are then counted for the beam splitter. If, at the overlap device, a ray deflection takes place for both incident light rays onto the overlap device, two ray deflections are counted for the overlap device.

For an interferometer with the same arm lengths, it is possible to theoretically prove that, for the number of ray deflections being four, the first condition that a central ray exists which is split at the beam splitter into the first and the second central rays, wherein the first and second central rays overlap on the detection plane in the interference area, is fulfilled by an infinitely large number of light rays. As this contradicts claim 1, where it is required that (for the given object point) exactly one such central ray exists, it has been proved that an interferometer with identical arm lengths and four ray deflections cannot satisfy claim 1. It has also been proved for the same interferometer that for a light ray that leaves the object point of the object and is part of the light beam, but is not the central ray, there is a first light ray running through the first interferometer arm and a second light ray running through the second interferometer arm, which are split off from the light ray at the beam splitter and which strike the detection plane at the same point. It has therefore been proved for this interferometer that the second condition of the main claim is not fulfilled.

It has also been proved theoretically and experimentally for an interferometer with six ray deflections that the features of claim 1 can be implemented. Measurements on a prototype already implemented can be supplied on request.

Herein, the arm length is the length covered by the first or second central ray from the beam splitter to the central image point on the detection plane. The same arm lengths therefore mean that the lengths for the first and second central rays are the same.

Preferred is that a first plane or incident plane which is given by the first central ray and the second central ray directly after the beam splitter and a second plane or exit plane which is given by the first central ray directly before the overlap device, are unequal.

Preferred is a distance between the first plane and the second plane that is greater than 0.01 times and a further preference of 1 times the diameter of the beam splitter aperture. This definition applies to parallel planes.

For non-parallel planes, the angle between the first plane and the second plane is preferably greater than 5°, a greater preference is more than 10°, an even greater preference is more than 20° and the greatest preference is for more than 45°.

Preferred is that the interferometer has monolithic optics or setup, which comprises the beam splitter, overlap unit and all ray deflection elements in the first and second interferometer arms. All ray deflections in the monolithic optics take place here on the inner side of the monolithic optics.

Preferred is that either the first interferometer arm and/or the second interferometer arm has a device for changing an optical path of the corresponding interferometer arm. For execution of the method for determining a phase difference at at least one point on the interference area of the three-dimensional interferometer, it is necessary to change the optical path in an interferometer arm. It is preferred here that the change to the optical path is less than or equal to a phase change of $2\pi$. For details of the method, see the description below of the method.

The change to the optical path can be achieved here by displacement of at least one optical element. If a change in the direction of the propagation occurs, a choice between several procedures is available. Firstly, the effect on the propagation direction is so small that it can be neglected. Secondly, the effect can be taken into account in the evaluation. Thirdly, the change in the propagation direction can be compensated on receipt of the change to the optical path.

According to a further embodiment, the interferometer preferably also has a device for the relative displacement, relative stretching, relative tipping and/or relative rotation of an existing first light field on the detection plane that originates from the first light beam and of an existing, second light field on the detection plane that originates from the second light beam.

The device is therefore used, e.g. to change or transform the first electric field on the detection plane relative to the second electric field on the detection plane so that the transformed first electric field relative to the original electric field can be described by a projective mapping. Preferred is the projective mapping of an affine mapping. Any projective mapping comprises a sequence of displacements, stretchings, especially point stretchings, tippings of a plane in space as well as rotations. The sequence here can also be changed.

The device for relative displacement, relative tipping and/or relative rotation can be implemented by a local displacement or tipping of an optical element, for example a ray deflection element in the ray path, e.g. in one of the interferometer arms.

A relative displacement of the first electric field on the detection plane is also called "lateral shear". For the present interferometer, which has a location resolving detector with pixels, a "lateral shear" of at least one pixel is required; preferred is a lateral shear between 1 and 10 pixels. A relative rotation of the first electric field to the second electric field is also referred to as "rotational shear".

An independent data set for an interference term IF due to the different relative position is produced and the rank of the conditional equation for the phase is raised.

By recording an interferogram with a transformed first or second electric field wherein the other relevant electric field remains unchanged, an interference signal between the first and second electric fields for each pixel of the detector in the detection plane is supplied, enabling more information to be obtained about the interference between the two electric fields. This enables a raising of the rank of the square matrix equation $$E_1(x_{i,j}) * \overline{E_2(x_{i,j})} = e^{i\Psi_{i,j}} |E_1(x_{i,j})| |E_2(x_{i,j})| = IF_{i,j} \quad (4),$$

which in connection with the method for determining a phase of an electric field in a part of the interference area of the three-dimensional interferometer is explained below in more detail.

Herein, E1 indicates the first electric field on the detection plane that originates from the second beam, E2 is the first second electric field on the detection plane that originates from the second beam, $\Psi$ the phase difference between E1 and E2 and IF the interference term between the fields E1 and E2. It should not make any difference whether the electric field is called E1 or $E_1$. A pixel grid is made according to equation (4) for a pixel location x that has the indices i and j. Details of the equation (4) in connection with the invention-related methods are described below.

Physical quantities in the present application are often noted with indices for practical reasons. The expert however understands here that a corresponding non-indexed physical quantity can be used. A corresponding formulation of the relevant equation can be derived.

The rank of an equation system is understood as the number of independent conditional equations. If the number of conditional equations is less than the number of variables, the equation system is under-determined, i.e. the rank is lower than the number of independent variables. If the number of independent equations is greater than the number of variables, the equation system is over-determined. The equation system is then solved in such a way that the equations are only approximately satisfied, but here the deviation, e.g. the quadratic deviation, is minimized. If the number of independent equations is exactly equal to the number of variables, i.e. when rank equality is achieved, then there is an exact solution to the equation system.

For the invention-related interferometer, rank equality or over-determination are preferred for the equation system of equation (4) and the equation systems derived thereof. Over-determined equation systems can be very robust against measurement errors and noise.

The preferred use of the invention-related interferometer is as holographic camera. In this use, the amplitude and phase of a radiation field emanating from a real object are measured. This is in contradiction to a conventional camera that only measures the amplitude or the equivalent intensity.

The ray path can be selected in the same way in both cases, i.e. the light source illuminates the object and the reflected light passes through an optical collection device and falls onto the camera where a real image can be produced.

With a conventional camera, it is necessary that a real image is produced using so-called focusing; with the holographic camera, a post-focusing is also computationally possible.

Due to the mapping, the phase position of each scattering object point is measured by the holographic camera, i.e. the spatial position to a multiple of a wavelength. Transparent dielectric layers also change the recorded image as is well known from phase-contrast microscopy. During phase-contrast microscopy, only one contrast is produced in the phase; the holographic camera measures the phase as a numerical value.

The holographic camera can therefore be used on existing optical systems to obtain additional image information.

The invention-related interferometer can be used with visible light, but also—in a suitable embodiment—with X-rays ultraviolet, infrared and far infrared.

When designing, the appropriate technologies are to be employed for mirrors and grids. The use of transparent media can be dispensed with.

The use with other wave types is also possible, e.g. electron waves in an electron microscope and also neutron waves. An advantage is that the coherence requirements of the interferometer are low. The path differences must be lower than the coherence length. It is also possible to work the invention when the paths are identical.

In the following, the method for determining a phase difference at at least one point of the interference area of the three-dimensional interferometer as well as the method for determining a phase of an electric field in a part of the interference area of the three-dimensional interferometer is presented. These two methods make it possible to first measure a light field produced by an object using the invention-related interferometer. In this respect, these two methods are extremely important in being able to use the invention-related interferometer for the intended purpose.

When describing the methods, the description here differs from that describing the interferometer. Firstly, the geometric approximation was also used in describing the interferometer. Also, only a small, selected beam was examined in the description of the interferometer which assumed a freely selected reference point on the object. In the description of the method, this simplified approach is dispensed with and an arbitrary radiation field is assumed. This is appropriate, as in reality the invention-related method can also be performed in this way.

The term beam is also wider in connection with the invention-related methods as the object has a multitude of object points. A light beam leaves each object point. A beam is so defined here that all rays leaving an object point constitute the beam. A superposition of many beams through the interferometer is propagated through the interferometer arms which are brought to interference in the interference area of the detector plane.

For this, the so-called fundamental equation of the invention-related interferometers is first derived.

As already shown above, the first electric field, which originates from the first beam, and the second electric field, which originates from the second beam, interfere in the interference area on the detection plane. The measured intensity of the squared absolute value of a superposition of the first and second electric fields is therefore in the interference area on the detection plane. This can be described as follows:

$$I_g = |E_1(x_{i,j}) + E_2(x_{i,j})|^2 \quad (5),$$

wherein $E_1(x_{i,j})$ the first electric field is at the location $x_{i,j}$ and wherein $E_2(x_{i,j})$ the second electric field is at the location $x_{i,j}$. A pixel grid with the indices i and j has been generated for the location wherein the two indices for two orthogonal, spatial directions stand on the detection pane or the interference area.

Equation (5) can be calculated as:

$$I_g = |E_1(x_{i,j})|^2 + |E_2(x_{i,j})|^2 + E_1(x_{i,j}) \cdot \overline{E_2(x_{i,j})} + \overline{E_1(x_{i,j})} \cdot E_2(x_{i,j}) \quad (6),$$

wherein $$E_1(x_{i,j}) * \overline{E_2(x_{i,j})} = e^{i\varphi_{i,j}} |E_1(x_{i,j})||E_2(x_{i,j})| = IF(x_{i,j}) = IF_{i,j} \quad (7)$$

is the equation for the interference term IF. Here, $\overline{E_2(x_{i,j})}$ is the complex conjugated second electric field.

The following abbreviations are used for the sake of simplicity:

$$E_1(x_{i,j}) = E1_{ij} \quad (8)$$

$$E_2(x_{i,j}) = E2_{ij} \quad (9)$$

$$IF(x_{i,j}) = IF_{ij} \quad (10)$$

A relationship between the first and second electric fields on the detection plane can be derived exactly using the Rayleigh-Sommerfeld diffraction integral. Exact knowledge of the interferometer is a precondition here, including all apertures, deflectors and cut-outs. It is presumed that the first electric field on the detection plane is known. By the use of the Rayleigh-Sommerfeld diffraction integral, it is possible to calculate exactly how the field distribution of the first electric interferometer was before the first electric field strikes the detection plane. This therefore also enables a back-calculation on how the field distribution of the first electric field was in or on the beam splitter. From there, it is possible to propagate or calculate this back-calculated electric field again further along the second interferometer arm up to the detection plane. It is therefore possible, if either the first or second electric field is given on the detection plane, to calculate a different electric field in each case. A bijective mapping therefore lies between the two electric fields which can be expressed as matrix U. The matrix U here is also known as the propagation matrix. The connection between the first and second electric fields can be expressed as follows:

$$E2_{mn} = \sum_{i,j} U_{mn,ij} \cdot E1_{ij} \quad (11)$$

Herein, the pixel grid (m, n) with the indices m and n describes preferably the same pixel grid (i, j) with the indices i and j for the detection plane, as already explained above. The electric fields herein are regarded as vectors in which all indices are consecutively numbered according to a certain sequence. The order here is not significant. For example, the entries for the vectors can initially have all pixels in the first row and, after that, all pixels in the second row and so on till the last row is reached. The indices i and j of the first electric field $E1_{ij}$ can therefore be regarded as a single index of a vector that, because of the two-dimensional pixel grid, has two indices. Accordingly, $U_{mn,ij}$ is a common matrix wherein the rows are designated by the two indices m and n and the columns by the two indices i and j. The matrix U must be individually calculated or determined for each invention-related interferometer.

The matrix or mapping U has all geometric and all diffraction effects when suitably selected. U is generally an approximately unitary matrix. It applies for a unitary matrix that the adjoint matrix or Hermitian transposed matrix of the matrix U is equal to the inverse of the matrix U, matrix $U^{-1}$. That U is generally only an approximate unitary matrix, has its origins in that fact that with an exact propagation of the electric field, field components can also leave the indexed inspection area; these field components are therefore cut off and are lost. This is influenced by a suitable choice of calculation area and the fineness of the indexing.

If $E2_{ij}$ in equation (7) is replaced by the expression from equation (11), the result is:

$$IF_{i,j} = E_1(x_{i,j}) * \overline{E_2(x_{i,j})} = \quad (12)$$

$$E_1(x_{i,j}) \cdot \sum_{m,n} \overline{U_{ij,mn} \cdot E1_{mn}} = E1_{ij} \cdot \sum_{m,n} \overline{U_{ij,mn}} \cdot \overline{E1_{mn}}$$

If the interference term IF has been measured including the phase, i.e. as a complex quantity, this equation is a quadratic equation in the fields $E1_{ij}$. If it is assumed with an interferometer that the indices i, j, m and n run from 1 to 1000 for example, this quadratic equation is very difficult to solve. If the equation (12) is multiplied by the complex conjugated first electric field $E1_{ij}$, the result is an equation that, with knowledge of the absolute value of the first electric field $E1_{ij}$, is very much simpler to solve, namely the fundamental equation of the invention-related interferometer:

$$IF_{ij} \cdot \overline{E1_{ij}} = |E1_{ij}|^2 \cdot \sum_{m,n} \overline{U_{ij,mn}} \cdot \overline{E1_{mn}} \quad (13)$$

The method for determining a phase difference at at least one point of an interference area of the three-dimensional interferometer as well as the method for determining a phase of an electric field in a part of the interference area of the three-dimensional interferometer are both concerned with this fundamental equation. For simplification, the method for determining a phase difference is named as first method and the method for determining the phase of the electric field named as second method.

Equation (13) is, with knowledge of the absolute value of the first electric field $E1_{ij}$, a linear equation for the complex, phase-related field $\overline{E1}_{ij}$, which is relatively easy to solve. Prerequisite for this is that the interference term IF is measured or determined as a complex quantity, the propagation matrix U has been calculated and the absolute values of the first and second electric fields are known. The solution for equation (13) then delivers the first electric field as a complex quantity for at least a part of the interference area. The second electric field can then be calculated as a complex quantity with the help of equation (11).

This shows that the relevant phases can be calculated from the measured data of the interference term IF by solving a linear homogeneous equation using the amplitudes of the electric fields. This can be achieved by Singular Value Decomposition (SVD), for which the numerical effort is low. This is an essential finding of the present invention.

Herein, the phase of the interference term IF is determined by the first method. With knowledge of the absolute values of the first and second electric fields, it is therefore possible to determine the interference term IF as a complex quantity.

In the method with "spatial carrier", the amplitude is not measured, depending on the method, but only an analysis of the diffraction fringes is made "Fringe Analysis", i.e. a determination of the phase; see e.g. Handbook of Optical Metrology, 2nd Edition, CRC Press Taylor and Francis Group, Edited by Toru Yoshizawa, Chapter 8, "Speckle Methods and Applications", Nandigana Krishna Mohan, Chapter 8.5.1, "Fringe Analysis".

The phases of both electric fields are determined with the help of the second method. Both methods are presented below.

In addition, an object of the invention is achieved by a method for determining a phase difference $\Psi_{ij}$ at at least one image point of an interference area between a first electric field and a second electric field which interfere at at least one image point, wherein the first electric field originates from a first interference arm and the second electric field originates from a second interference arm.

The method for determining a phase difference is a first step as a precondition for the second step, namely the method for determining a phase of an electric field in a part of the interference area of the three-dimensional interferometer, which therefore determines—starting with a first step— the method for determining a phase difference, a phase of an electric field in a part of the interference area according to the fundamental equation (13).

The use of an invention-related interferometer is preferred in performing the method for determining a phase difference.

A point or a pixel of a pixel grid (i, j) of the detection plane of the invention-related interferometer is preferred as an image point.

The phase $\Psi_{ij}$ is a phase difference, given as the difference between the phase of the first electric field $\Phi1_{ij}$ and the phase of the second electric field $\Phi2_{ij}$ and can therefore be expressed as:

$$\Psi_{ij} = \Phi1_{ij} - \Phi2_{ij} \quad (14)$$

On the one hand $\Psi_{ij}$ is a phase difference between the phases of the interfering electric fields; on the other hand, however, also a phase of the interference term $IF_{i,j}$. In general, however, a phase measurement is only possible with the exception of an additive constant.

It is therefore possible in determining the phase $\Psi_{ij}$, without limiting the generality, to $\Psi_{ij}$ add a constant $\alpha$.

Equation (6) can therefore be written as:

$$I_g = |E1_{ij}|^2 + |E2_{ij}|^2 + IF_{ij} + \overline{IF_{ij}} = |E1_{ij}|^2 + |E2_{ij}|^2 + 2 \cdot \Re(IF_{ij}) == \quad (15)$$
$$|E1_{ij}|^2 + |E2_{ij}|^2 + 2 \cdot |E1_{ij}||E2_{ij}| \cdot \cos(\Psi_{i,j} + \alpha)$$

For a single pixel with the given indices i and j, this equation cannot be uniquely solved for a given $\alpha$ as the cosine function is not unique, because it takes any function value between −1 and 1 at two different points. Additional information is required because of this ambiguity.

There are in principle two possibilities for resolving this ambiguity. These two known methods in prior technology are called "temporal phase shifting" and "spatial phase shifting", see for example Handbook of Optical Metrology, 2nd edition, CRC Press Taylor and Francis Group, edited by Toni Yoshizawa, Chapter 8, "Speckle Methods and Applications", Nandigana Krishna Mohan, Chapter 8.5.1, "Fringe Analysis". The expression "phase shifting" is used in part for "temporal phase shifting". The expression "carrier phase" is used in part for "spatial phase shifting". When performing the method for determining a phase difference of the so-called first method, the phase-shifting method or the spatial carrier method is applied in relation to the invention. Preferred is an application which combines the phase-shifting method and the spatial-carrier method. This has the advantage that it leads to a further increase in accuracy.

With the phase-shifting method, the phase, i.e. the phase difference $\psi$, varies in order to measure the measured function, i.e. the total intensity $I_g$ for different values of the cosine function. The phase difference $\psi$ can be varied in that the interferometer is fitted with a device for changing the relative path length. This can be realized in that the first interferometer arm and/or the second interferometer arm has a device for changing an optical path of the corresponding interferometer arm. Preferred is solely an interferometer arm that has a device for changing the optical path. A change in the optical path by a wavelength results in a phase change of $2\pi$. The phase $\Psi_{ij}$ used in equation (15) therefore changes according to the following substitution:

$$\Psi_{i,j} \rightarrow \Psi_{i,j} + 2\pi \frac{\Delta s}{\lambda} \quad (16)$$

wherein $\Delta s$ is the change in the optical path and $\lambda$ the wavelength used.

For the carrier-phase method, the invention-related interferometer is configured in such a way, that the phase difference $\psi$ in a selected direction is a monotonic function of the location x. This can be achieved in that the overlap of the light rays in the interference area is set below a minimum angle, i.e. in that an additional phase is applied to the phase difference, by an angle between the central rays. The method is therefore also called carrier phase method.

With both methods, it is possible to determine the phase $\Psi_{i,j}$ with the exception of an additive constant. It is also possible to determine the additive constant to within a difference of $2\pi$.

Preferably, the first method is evaluated for at least two points of the interference area. Preferred is that the first method is evaluated for a part of the interference area, especially the entire interference area.

For the case where the detection plane is divided into pixels, the first method is performed preferably for two pixels, more preferred for a part of all pixels, and especially preferred for all pixels.

Preferred is that several measurements are made in the first method.

Subsequently, the above-mentioned specified phase constant α will be discussed. The phase α is a phase factor which is, by definition, the same for all pixels in the inspection region. With respect to the total inspection region, the phase factor α can be uniquely defined up to a multiple of 2π. Especially in the methods with phase-shifting, for which the optical path lengths between the first and second interferometer arms are changed, a position of the path lengths must be chosen as the reference position, to which all subsequent phase information is related. For this position α is uniquely defined, in that the calculated interferogram for the reference position according to equation (15) is compared with the measurement result and determines α so that the matching accordance is optimum, especially that the node lines are in agreement.

It is pointed out that the propagation matrix U must be calculated for this reference position, i.e. that both the interference term IF and the propagation matrix U must be calculated for the same path length difference. The importance of the agreement of the reference points can be recognized, among other things, by the fact that the equation (13) in the second method is only then invariant with changes in the α-values, respectively the phase of the interference term IF, when simultaneously the propagation matrix U is shifted in its phase.

Especially the central image point can be used, when determining the α value and the exact relative phase position of the arm lengths. The phase difference measured at the central image point is independent of the phase position of the incident light field and is solely the result of the different path lengths of the arms. The central image point is therefore suitable for calibration of the device.

When using the interference term IF in the fundamental equation, it is always assumed in the following that the interference term IF and the propagation matrix U refer to the same arm-length configuration and that the definition of α for the interference term IF is unique.

In addition, an object of the invention is achieved by a method for determining a phase of an electric field in a part of an interference area on a detection plane of a three-dimensional interferometer. The method preferred here is suitable for determining a phase of an electric field in a part of the interference area of the detection plane of the three-dimensional interferometer described above. This invention-related method is also described in short form as the second method. The second method, as described below, has four steps.

In the first step, the intensities or absolute values of the first and second electric fields are determined for a part of the interference area. This means that for each point of a part-area of the interference area, the absolute value for the first electric field and the absolute value for the second electric field are determined. As the intensity of the electric field is proportional to absolute value squared of the electric field, the determining of the absolute value for the electric field is equivalent to the determining of the intensity of the electric field.

According to the first step, it is required that the absolute value of the first electric field and the absolute value of the second electric field are determined. Alternatively, however, the absolute value of the first or second electric field and the absolute value of the interference term IF can also be determined. As the absolute value of the interference term is equal to the product of the absolute value of the first electric field and the absolute value of the second electric field, it is possible to calculate the other of the two electric fields, from the knowledge of the absolute value of the interference term IF and of one of the two electric fields.

There are several methods and possibilities for determining the absolute values of the first and second electric fields.

According to the first possibility, the amplitude of the first or second electric field can be determined from an intensity measurement in which the other interferometer arm is blocked and the intensity distribution of the pixels on the detection plane is measured. As the measured intensity is proportional to the absolute value squared of the sought-after electric field, the absolute value of the sought-after electric field can be obtained in relative units by taking the square root of the absolute value of the sought-after electric field. Alternatively, the proportionality factor can be calculated for obtaining the correct absolute value of the sought-after electric field.

According to a second possibility, a complete fit of the measured signal for various phase positions can be obtained from the phase-shifting method, especially the method of temporal phase shifting, i.e. the total intensity $I_g=|E1_{ij}+E2_{ij}|^2$ and the value of the interference signal IF, i.e. $|E1_{ij}||E2_{ij}|$. From these two measured values, each of which is a function of two variables, $|E1_{ij}|$ and $|E2_{ij}|$ can be determined by solution of the quadratic equation with the exception of exchanging the indices 1 and 2.

The expression "a part of the interference area" here means a part-area of the interference area. The part-area here includes a certain number of points. The part-area is not necessarily connected in the mathematical sense, which means that it can also be disconnected.

If the interference area or the detection plane has a pixel grid, the method can also be carried out for a part of the pixels of this pixel grid. It is well known to the expert how to evaluate and calculate continuous functions. The equations for the interference area are given here using a pixel grid for the sake of simplicity and greater practical relevance. The method is however also to be claimed for continuous functions, even when this is not directly reflected in the equations.

In the second step of the second method, the interference term IF for the same part of the interference area is determined according to the equation $$IF_{ij}=|E1_{ij}|\cdot|E2_{ij}|\cdot\exp(i\cdot\Psi_{ij}) \quad (17) \text{ (see equation (7))}$$

Here, $\Psi_{ij}$ is the difference between the phase $\Phi 1_{ij}$ of the first electric field $E1_{ij}$ and the phase $\Phi 2_{ij}$ of the second electric field $E2_{ij}$. Therefore, the following applies: $\Psi_{ij}=\Phi 1_{ij}-\Phi 2_{ij}$ (see equation (14)).

The phase difference $\Psi_{ij}$ is preferably determined with the help of the first method. It is can here that the phase difference an also be defined without knowledge of the sizes of the absolute values of the electrical fields, i.e. of the first and second electrical fields.

With the phase difference $\Psi_{ij}$, it is possible to determine the interference term IF as a complex quantity, cf. equation (17) or (7).

In the third step of the second method, a propagation matrix U is determined, especially for the above-mentioned part of the interference area. Herein, the propagation matrix U is identical with the matrix U mentioned in the context of the interferometer fundamental equation. The components of the propagation matrix U have already been shown and explained above and are written as $U_{mn,ij}$. An element of the propagation matrix U, i.e. $U_{mn,ij}$, indicates here, how for a given pixel grid of the interference area, the first electric field $E1_{ij}$ at a pixel with the indices i and j can be transformed into a second electric field $E2_{ij}$ at a pixel with the indices m and n.

As already shown above, the transformation equation applies:

(cf. equation (11))

$$E2_{mn} = \sum_{i,j} U_{mn,ij} \cdot E1_{ij} \qquad (18)$$

The propagation matrix U can preferably be calculated with the Rayleigh-Sommerfeld-propagation formula, see Max Born and Emil Wolf, Principles of Optics, Cambridge University Press, 8.the Edition, 2013, Chapter 8.11 Rayleigh-Sommerfeld diffraction integrals, especially Chapter 8.11.2, formula (14).

The Rayleigh-Sommerfeld-propagation formula is applied here as follows. An arbitrary, imaginary first electric field on the detection plane is propagated, taking the geometry into account, backwards along the first interferometer arm as far as the beam splitter and then propagated forwards along the second interferometer arm as far as the interference area of the detection plane. In this way, a propagation matrix U can be calculated, specifically for the specific configuration of the three-dimensional interferometer, that is applicable for an arbitrary first electric field $E1_{ij}$.

The formulae shown describe the electric fields in the scalar approximation, i.e. the polarization of the electric field is not represented in the formula. This is correct when the light is unpolarized or when only one polarization is present and when the polarization at the overlap is parallel.

If this not the case, it has to be ensured that only light with the same polarization can interfere. This can be brought about by a suitable rotation of the polarization in one of the two arms so that the first and second electric fields have the same polarization on the detector. It is preferred that the interferometer is correspondingly configured.

In the most general case of arbitrary polarizations, separate equations for each of the polarizations would have to be set up and a mixture of polarizations would have to be permitted with the propagation of the fields. This makes the evaluation of the interference images more complicated as it gives a further degree of freedom; the procedure, however, is feasible using the methods described.

In the fourth step of the second method, the fundamental equation of the invention-related interferometer (cf. equation (13))

$$|E1_{ij}|^2 \cdot \sum_{m,n} \overline{U_{ij,mn}} \cdot \overline{E1_{mn}} = IF_{ij} \cdot \overline{E1_{ij}} \qquad (19)$$

for the above-mentioned part of the interference area is solved for the complex first electric field $\overline{E1_{ij}}$. The singular is used here for the complex first electric field $\overline{E1_{ij}}$. Nevertheless, the expert understands that the variables are the individual components $\overline{E1_{ij}}$ for each index i and j in the equation (19) or (13). Therefore, it is also possible to use the plural if it is understood that the target quantities are, in each case, the first electric field at several points, namely at the pixel positions of the detection plane.

The first electric field $E1_{ij}$ is obtained by complex conjugation. Preferably, the second electric field $E2_{ij}$ can also be obtained by use of the transformation equation (18).

With that, both the phase and the absolute value of both the first and second electric fields are defined by the second method for each point of a part of the interference area.

Herein, the first three steps of the second method can be performed in an arbitrary order.

It has already been shown in connection with the first method that the phase difference $\Psi_{ij}$ can also be defined without knowledge of the sizes of the absolute values of the electrical fields, i.e. of the first and second electrical fields. The first step of the second method is therefore independent of the second step of the second method so that the sequence of the first and second steps of the second method can also be reversed. The third step is solely a calculation that depends on the geometry of the interferometer used. The third step is therefore also independent of the first two steps of the second method.

In the following, conclusions are drawn concerning the fundamental equation (19).

When solving equation (19), knowledge of the absolute value of the first electric field and of the complex interference term for each point of the part of the interference area is presupposed and knowledge of the propagation matrix U is required.

Under these conditions, the equation (19) is a linear equation for the complex first electric fields $\overline{E1_{ij}}$. Here, the plural "first electric fields" is used as the first electric field at each point of the part of the interference area being considered is meant. As the right side of equation (19) is also a function of the complex first electric fields $\overline{E1_{ij}}$, the equation (19) can be converted to a homogeneous equation. The homogeneous equation then has the form that a matrix multiplied by the vector of the complex first electric fields is equal to a zero vector.

As the pixel grid (i, j) is preferably identical to the pixel grid (m, n), the matrix is then a square matrix. In this case, a homogeneous linear equation system is present whose solution exists in the kernel of the matrix.

The rank of the linear equation system described in equation (19) can be increased so that there is a solution for the homogeneous equation (13). This can be achieved by performing further measurements and simultaneously evaluating these. The kernel of the equation (13) therefore has the dimension 1, or equivalently expressed, there is a solution for an eigenvalue of 0.

This can be achieved by a Singular Value Decomposition (SVD), for which the numerical effort is low. The sought-after solution to equation (13) is the eigenvector with the smallest singular value in the singular value decomposition. This method is robust against noise and other disturbances in the measured values. In the presence of noise, there is possibly no solution with an eigenvalue of exactly 0. The equation (19) can however also be solved by methods other than singular value decomposition.

The pixel grid described above (i, j) is preferably identical to the pixel grid (m, n). However, this must not necessarily be the case.

The fundamental equation of the invention-related interferometer is formulated above in the 0, especially for a pixel grid of the detection plane. This is however equivalent to the situation when this fundamental equation is described in Fourier space. This has several advantages, e.g. the representation of the propagation matrix U is very simple in this case, as the propagation matrix U is a diagonal matrix.

To achieve this, the propagation matrix U must also be calculated in Fourier space, which is designated as Û($k_x$, $k_y$) and which has the form:

$$\hat{U}(k_x,k_y)=\exp\{i \cdot k_z(k_x,k_y) \cdot z\} \quad (20)$$

wherein z is the path length difference between the two interferometer arms and $$k_z(k_x, k_y) = \sqrt{\left(\frac{2\pi}{\lambda}\right)^2 - k_x^2 - k_y^2}$$

In addition, the fundamental equation is also described on a different functional basis which is appropriate to the problem. For example, Legendre functions, Zernike polynomials or other orthogonal polynomials can be selected from the field of special functions. e.g. the hypergeometric function.

The second method preferably uses a sufficient number of points in the interference area so that the solution of the fundamental equation (cf. equation (13))

$$|E1_{ij}|^2 \cdot \sum_{m,n} \overline{U_{ij,mn}} \cdot \overline{E1_{mn}} = IF_{ij} \cdot \overline{E1_{ij}} \quad (19)$$

is unique up to a multiple of the solution. As the equation (19) corresponds to a homogeneous equation, a multiple of a solution is also a solution. All such solutions are to be considered as equivalent. When only such solutions occur, these are considered as unique.

If the equation (19) has no unique solution, it may be necessary to produce or record further interference data. This can be achieved, for example, by further data being recorded for the interference term IF with different relative spatial positions of the first and second electric fields that come to interference. Alternatively, the procedure can also be so described in that two or more recordings are made with the interferometer with a different projective mapping.

The present invention can be implemented by an interferometer, a computer program or by a combination of interferometer and computer program.

Every type of computer system or other device is suitable for implementing the method described here, i.e. the first method and the second method. A typical combination of interferometer and computer program computer program product could be a terminal computer system with a computer program that, if loaded and executed, controls the computer system so that it carries out the method described here. The same applies to, e.g. computer applications or applets that are stored on a chip card.

In addition, an object of the invention is achieved by a computer program. The computer program includes code parts that have been adapted for the execution of steps corresponding to the first and/or second method, when the said program is loaded into a computer.

In addition, an object of the invention is achieved by a computer program product. The computer program product is stored on an insertable medium and has computer-readable program means with which a computer can execute the first and/or second method.

Computer program means or computer program in the present context is any expression, in any language, any code or any notation, of a group of commands that serve to execute a certain function in a system with information processing capability—either directly or after one or both of the following operations: a) after conversion into another language, another code or another notation; b) rendition in another material form.

The present invention will now be further explained using individual examples and figures. These examples and figures serve only to illustrate the general invention concept without the examples and figures of the invention being interpreted as a limitation in any way.

FIG. 5 shows a schematic, which illustrates a projective mapping of the first electric field onto the second electric field.

FIG. 9 shows a schematic of an embodiment of an invention-related interferometer with a monolithic structure.

Figure 1:
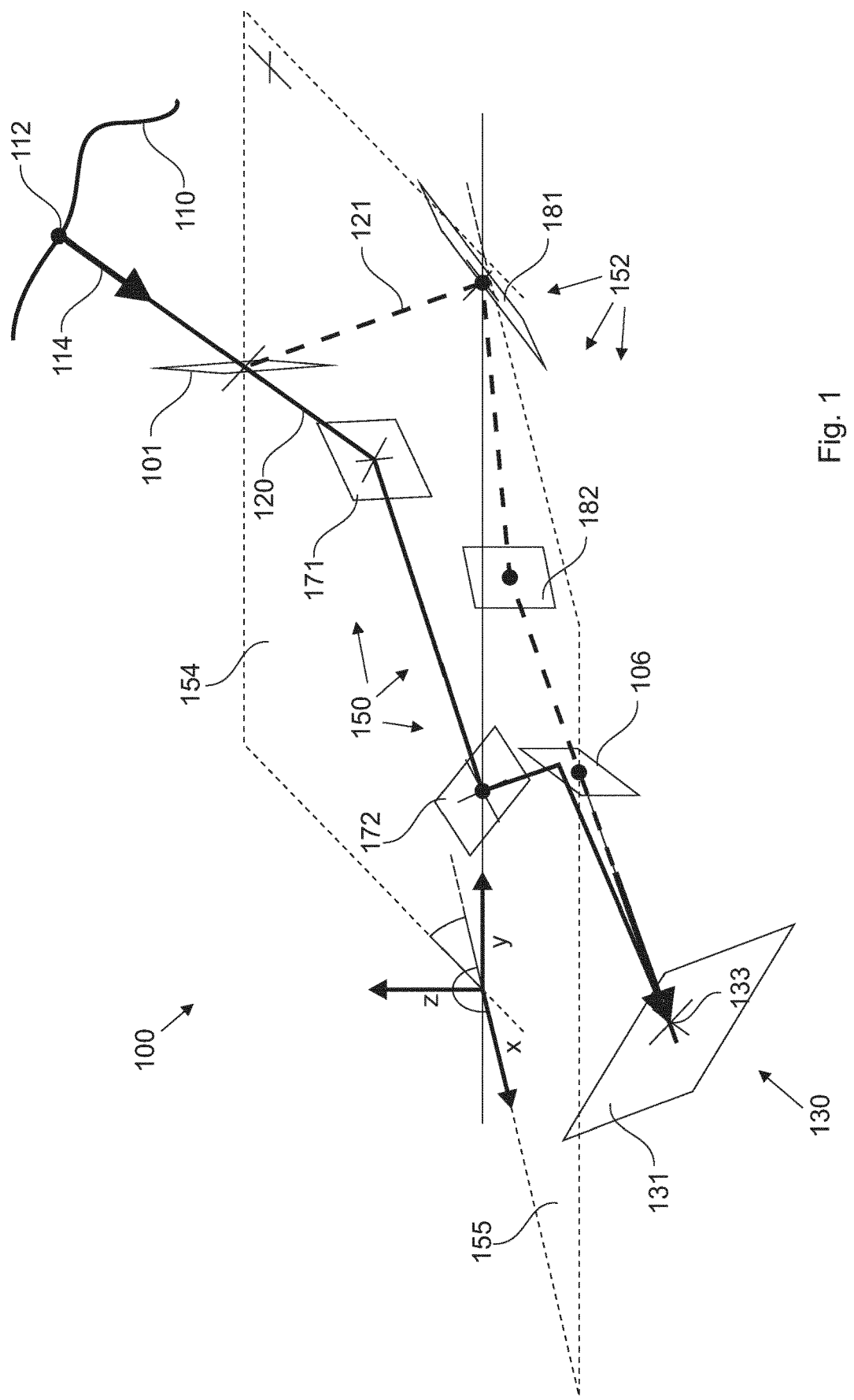
FIG. 1 shows a schematic illustration of an embodiment of an invention-related interferometer as an illustration of the main claim.

FIG. 1 shows a three-dimensional interferometer 100, which measures an interferometric light field produced by an object 110. As already described in the general description part, a special light field is used to characterize the invention-related three-dimensional interferometer. This is a light beam emanating from an object point 112 of the object 110, which is not shown in FIG. 1 for reasons of clarity. In FIG. 1, only a central ray 114 is shown, which is part of the beam. The central ray 114 runs out from the object point 112 to a beam splitter 101 at which it is split into a first central ray 120 and a second central ray 121.

One of the beam splitters 101 can be a beam splitter cube or a glass plate, which preferably has a coating matched to the light rays used.

The central ray 114 is split in amplitude at the beam splitter 101. The second central ray 121 is deflected here through a certain angle relative to the direction of the central ray 114, while the first central ray 120 has the same direction as the central ray 114. An incident plane 154 is defined by the first central ray 120 and the second central ray 121. The incident plane 154 is indicated graphically by a dashed line. In addition, a cross is located on the plane which calcifies the orientation of the incident plane 154.

The first central ray 120 runs into the first interferometer arm 150 after the beam splitter 101. The second central ray 121 runs into the second interferometer arm 152 after the beam splitter 101.

After the beam splitter 101, the first central ray 120 is deflected at a first ray deflection element 171 and a second ray deflection element 172, which are both positioned in the first interferometer arm 150. After the beam splitter 101, the second central ray 121 is deflected at a first ray deflection element 181 and a second ray deflection element 182, which are both positioned in the second interferometer arm 152. As already explained above, a certain number of ray deflection elements are necessary to rotate the distribution of the first and second electric fields.

The first central ray 120 is deflected by the second ray deflection element 172 in the first interferometer arm 150 and the second central ray 121 is deflected by the second ray deflection element 182 in the second interferometer arm 150 onto an overlap device 106. From there, the first central ray 120 and the second central ray 121 are deflected onto a detection plane 131 of a detector 130. As already discussed above, the first central ray 120 and the second central ray 121 meet in a common image point which is named central image point 133.

Generally, two incident light rays falling onto the overlap device directly after the overlap device do not become a single light ray. This also applies generally for two central rays, i.e. for the first central ray 120 and the second central ray 121. There is however an exception for case in which the central ray 114 is emitted by a central object point (not illustrated). It can be shown that the central object point is unique. It does not, however, have to lie in the field of view of the invention-related interferometer.

In the embodiment of FIG. 1, the second central ray 121, which falls onto the overlap device 106 from the second ray deflection element 182 in the second interferometer arm 152, is not deflected at the overlap device 106.

The first central ray 120 however, which comes into the first interferometer arm 150 from the second ray deflection element 172 in the first interferometer arm 150 and falls onto the overlap device 106, is deflected at the overlap device 106 in the direction of the central image point 133 of the direction plane 131.

The first central ray 120 directly before overlap device 106 and the second central ray 121 directly before the overlap device 106 define an exit plane 155. The exit plane 155 is indicated graphically by a dashed line. The incident plane 154 intersects the exit plane 155 in a straight line which corresponds to the y-axis of the coordinate system drawn in the figure. The exit plane 155 is arranged here in the x-y plane. The fact that the incident plane 154 is not coincident with the exit plane 155 corresponds to the definition of a three-dimensional interferometer.

The first interferometer arm 150 begins at beam splitter 101 and extends at least as far as the overlap device 106, strictly speaking however as far as detection plane 131. The second interferometer arm 152 begins at beam splitter 101 and extends at least as far as the overlap device 106, strictly speaking however as far as detection plane 131.

The three-dimensional interferometer 100, according to the embodiment of FIG. 1, has a total of six ray deflections. The first central ray 120 (which is the central ray 114 before the beam splitter 101) is not deflected at the beam splitter 101; however once in each case at the first ray deflection element 171 and at the second ray deflection element 172 in the first interferometer arm 150 and at the overlap device 106. The first interferometer arm 150 therefore has a total of three ray deflections.

The second central ray 121 (which is the central ray 114 before the beam splitter 101) is deflected at the beam splitter 101; once in each case at the first ray deflection element 181 and at the second ray deflection element 182 in the second interferometer arm 152 but not at the overlap device 106.

The second interferometer arm 152 therefore also has a total of three ray deflections. The first interferometer arm 150 and the second interferometer arm 152 therefore have a total of six ray deflections.

Figure 2:
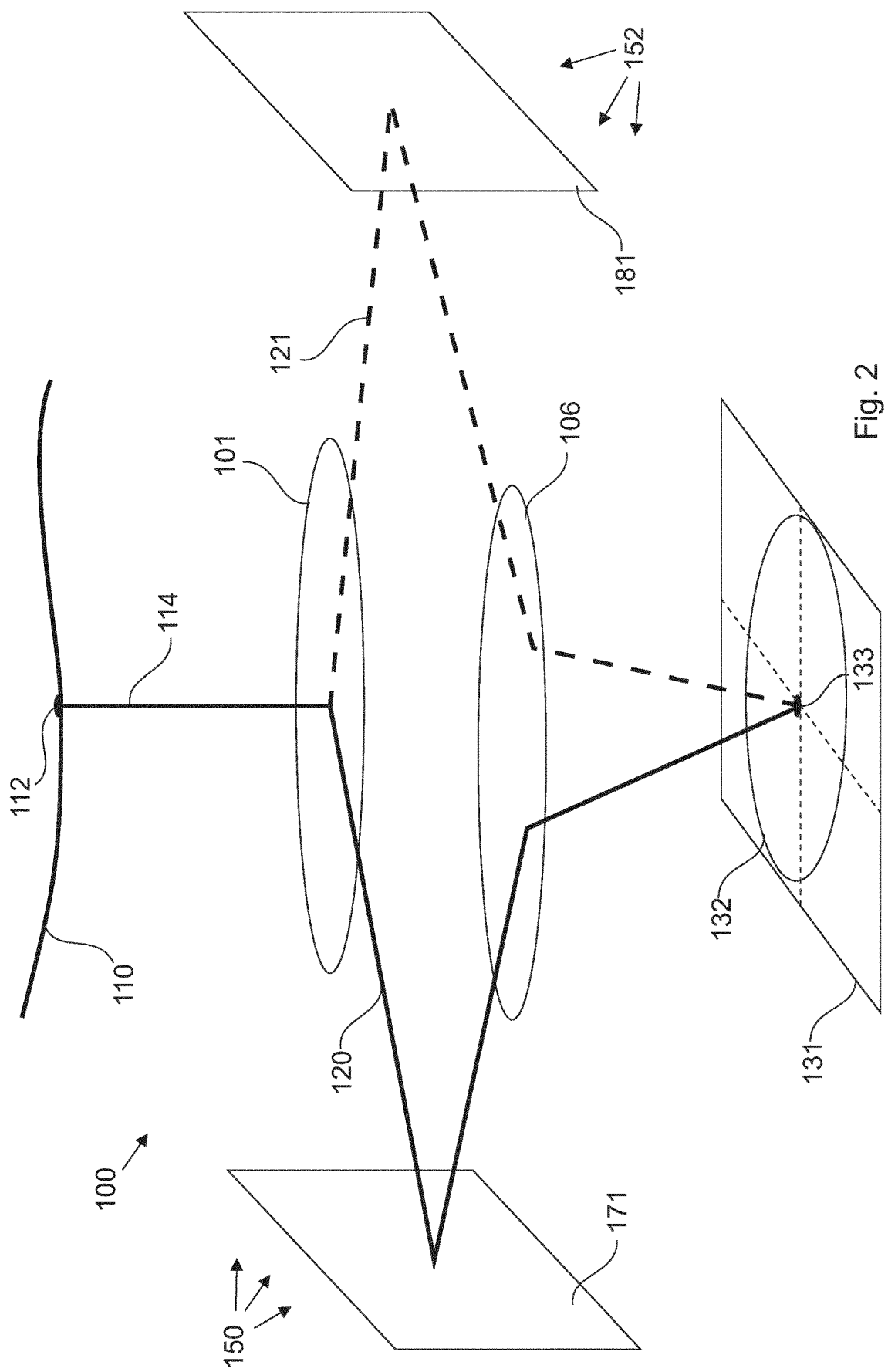
FIG. 2 shows a schematic illustration of an embodiment of an invention-related interferometer as an illustration of the first condition of the main claim.
Figure 3:
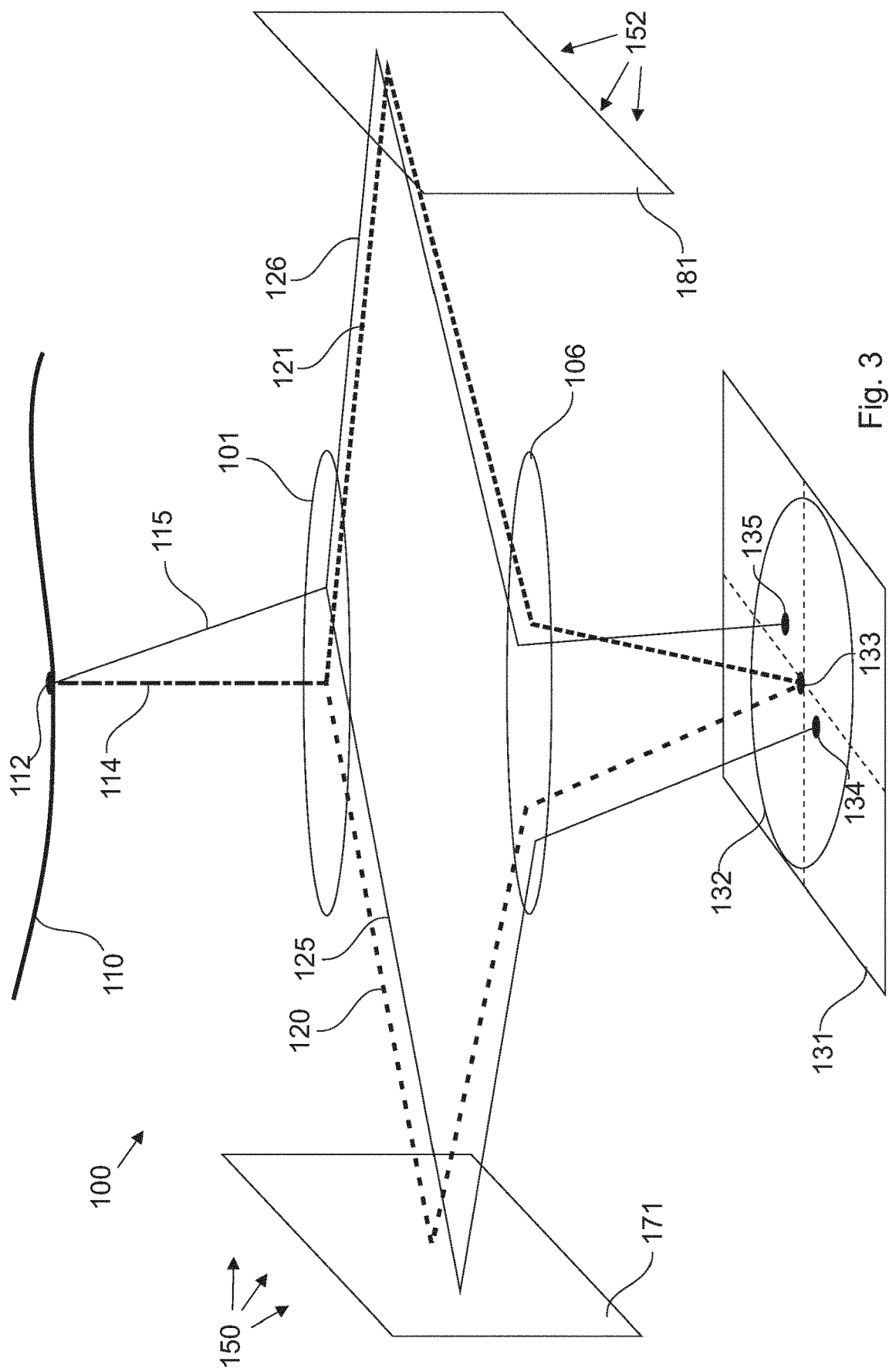
FIG. 3 shows a schematic illustration of an embodiment of an invention-related interferometer as an illustration of the second condition of the main claim.
Figure 4:
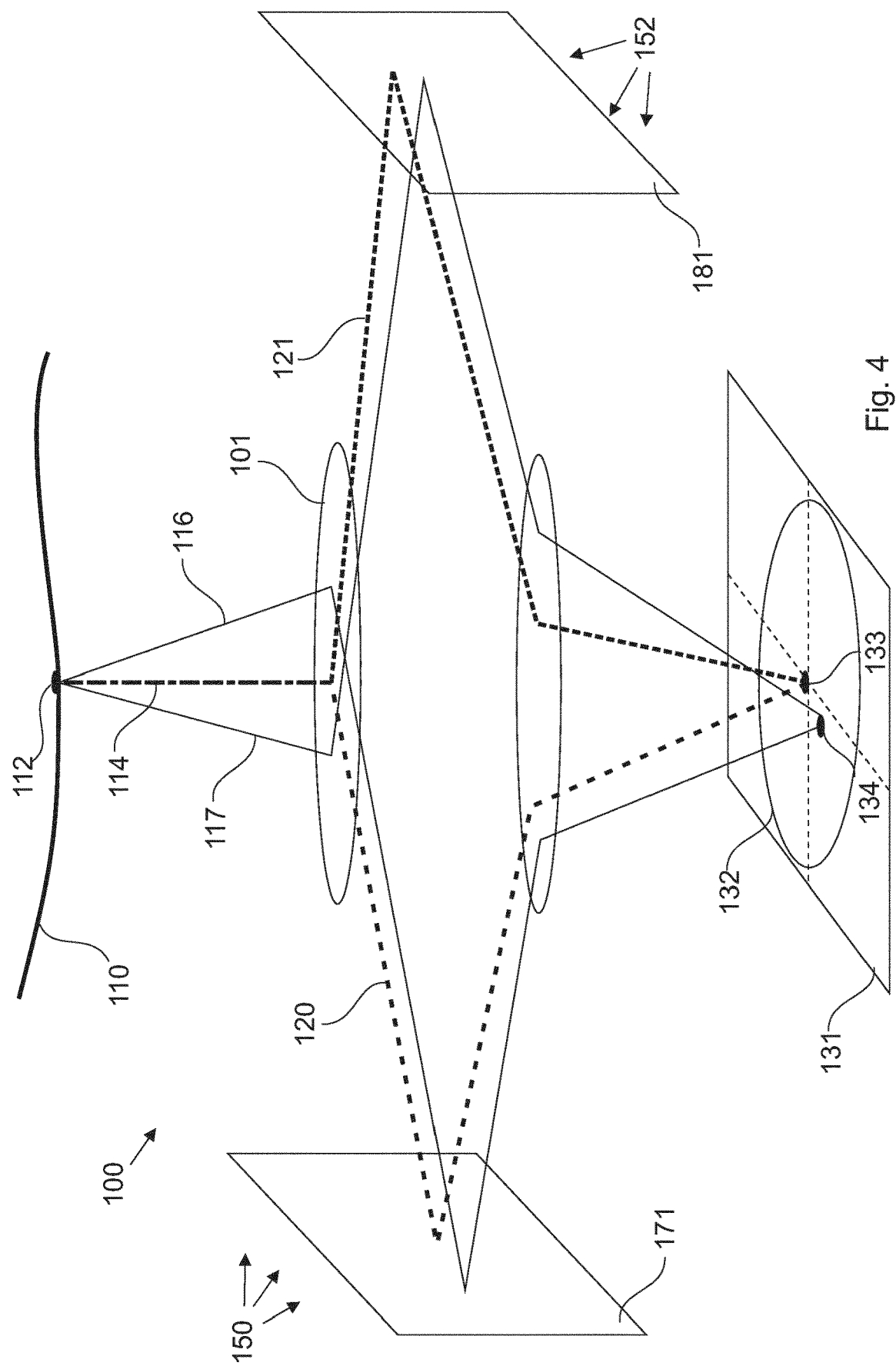
FIG. 4 shows a schematic illustration of an embodiment of an invention-related interferometer as an illustration of the third condition of the main claim.

FIGS. 2 to 4 show schematics of an embodiment of an invention-related interferometer to illustrate the three conditions of the main claim described in the general description part.

FIG. 2 here illustrates the first condition, FIG. 3 the second condition and FIG. 4 the third condition.

Just as in FIG. 1, an object 110 with an object point 112 can be seen at the upper end of FIG. 2, from which a central ray 114 emanates that is split at beam splitter 101 into a first central ray 120 and a second central ray 121. The beam splitter 101 is shown here in a simplified form.

The first interferometer arm 150 is also shown very much simplified and has only one first ray deflection element 171, which is also shown very much simplified. The second interferometer arm 152 is also shown very much simplified and has only one first ray deflection element 181, which is also shown very much simplified.

The first central ray 120 and the second central ray 121 are also deflected by an overlap device 106 (shown in simplified form) onto a detection plane 131 of a detector 130.

The first condition is that the beam splitter 101, the first interferometer arm 150, the second interferometer arm 152, the overlap device 106 and the detection plane are preferably so configured or adjusted, preferably configured, that for every object point 112 of the object 110 there is exactly one central ray 114 emanating from the object point 110, which is split at the beam splitter 101 into a first central ray 120 and a second central ray 121, wherein the first central ray 120 and the second central ray 121 overlap on the detection plane 131 in the interference area 132 in a central image point 133. It can be seen that the first central ray 120 and the second central ray 121 meet on the detection plane 131 in the central image point 133, wherein the propagation directions of the two central rays 120, 121 are not the same. This corresponds to the definition of "overlapping". For the exceptional case that the object point 112 is a central object point, the first central ray 120 and the second central ray 121 would have the same direction at the central image point 133; they would therefore be superposed. In the embodiment of FIG. 2 however, the general case is shown in which the object point 112 is not a central object point.

It should be emphasized that, in the embodiments of FIGS. 2 to 4, the incident plane does also not coincide with the exit plane. In the FIGS. 2 to 4, the first ray deflection element 171 in the first interferometer arm 150 and the first ray deflection element 181 in the second interferometer arm 152 stand representative for any possible further ray deflection elements. Because of this simplified method of representation, it cannot be seen clearly that the incident plane does not coincide with the exit plane.

FIG. 3 illustrates the second condition of the main claim. This says that for each light ray 115 that leaves the object point 112 of the object 110 and is part of the light beam, but is not the central ray 114, there are a first light ray 125 running through the first interferometer arm 150 and a second light ray 126 running through the second interferometer arm 152, which are split off from the light ray at the beam splitter 101 and which strike the detection plane 131 at different points 134, 135.

Compared to FIG. 2, the light ray 115 is added in FIG. 3, which is part of the light beam (not drawn) and which is not the central ray 114. The light ray 115 is divided at the beam splitter 101 into the first light ray 125 and the second light ray 126, wherein the first light ray 125 runs through the first interferometer arm 150 and the second light ray 126 runs through the second interferometer arm 152. After that, the first light ray 125 and the second light ray 126 are deflected at the overlap device 106 in the direction of the detection plane 131, wherein the first light ray 125 strikes the detection plane 131 at an image point 134 that is not the central image point 133 and the second light ray 126 strikes the detection plane 131 at an image point 135 that is not the central image point 133 and is also not the image point 134.

FIG. 4 illustrates the third condition of the main claim. This says that for each image point 134 of the interference area 132 that is not the central image point 133, there is exactly a third light ray 116 that emanates from the object point 112, is not the central ray 114, runs through the first interferometer arm 150 and strikes the image point 134 on the detection plane 131 and there is exactly a fourth light ray 117 that emanates from the object point 112, is not the third light ray 116 before the beam splitter, not the central ray 114, runs through the interferometer arm 152 and overlaps with the third light ray 116 at the image point 134 on the detection plane 131.

Simply expressed, the third condition says that for each image point 134, which is not the central image point 133, there is exactly a third light ray 116 and exactly a fourth light ray 117 which overlap in the image point 134. Neither the third light ray 116 nor the fourth light ray 117 is the central ray 114 here. In addition, the third light ray 116 runs through the first interferometer arm 150 and the fourth light ray 117 through the second interferometer arm 152.

The third light ray 116 and the fourth light ray 117 are part of the beam before the beam splitter 101. In the first interferometer arm 150, the third light ray 116 is part of the first light beam. In the second interferometer arm 152, the fourth light ray 117 is part of the second light beam.

These three conditions illustrated and explained above characterize an interferometer according to the invention.

According to the alternative formulation of the main claim, the beam splitter, the first interferometer arm, the second interferometer arm, the overlap device and the detection plane are so configurable or adjustable, preferably so configured, that a first electrical field that originates from the first beam and a second electrical field that originates from the second beam are each mutually transferable on the detection plane by a projective mapping P, wherein the projective mapping P in the interference area has exactly one fixed point, which is called the image point FIGS. 5a to 5d show schematics which illustrate a projective mapping of the first electric field onto the second electric field.

Here, starting with FIG. 5a, in which a first electric field $E1(x)$ is shown, it is indicated how the second electric field $E2(y)$ shown in FIG. 5d can be obtained via the intermediate steps of FIGS. 5b and 5c, by means of a general projective mapping.

FIG. 5a shows the detection plane 131 on which a field distribution 200 of the first electric field $E1(x)$ is dependent on the location vector x, which has a first component x1 and a second component x2. The coordinate origin is drawn in the bottom left corner of the detection plane 131. The distribution 200 shown is not a real electric field, but is solely to clarify a spatial structure. This spatial structure shown is easily discernible and can therefore be easily followed visually in the following transformation steps. For further clarification, the coordinates are emphasized of the first electric field at location $x_0$, which corresponds to the reticle shown.

A general projective mapping P can be shown as a sequence of a displacement, a rotation about a defined point and a concluding projection onto another plane.

Starting from the FIG. 5a, the field distribution of the first electric field $E1(x)$ in the FIG. 5b is only shifted by a constant vector. This vector has a large x1 component and a smaller x2 component.

Only when it is a complete projective mapping, is the transformed field distribution a real field distribution, namely the field distribution of the second electric field on the detection plane 131. As the projective mapping which is not yet complete at this point, the field distribution has to be an intermediate product which is designated as field distribution 202 of the transformed first electric field.

Starting from the FIG. 5b, the field distribution 202 of the transformed first electric field is rotated about a defined point so that the field distribution 202 of the transformed first electric field is obtained, as shown in FIG. 5c.

The following step from FIG. 5c to FIG. 5d is the most complicated as it contains a projection. Starting from FIG. 5c, the projection is designed as follows so that the result of the projection of the field distribution 202 of the FIG. 5c in the detection plane 131 can be seen in FIG. 5d.

The projection of FIG. 5c onto 5d is made clear by the following example. A projection can be illustrated with the example of a book page. If a book page is looked at and is rotated in space and the contour then looked at, the contour depicts a projection of a rectangle. The step from FIG. 5c to FIG. 5d illustrates exactly this. Starting out from FIG. 5c, the detection plane 131 is shifted and rotated in space, which can be easily seen from the four corners of the detection plane 131 of FIG. 5c. The field distribution 202 of the transformed first electric field was then projected onto the original detection plane 131, which then leads to the field distribution shown in FIG. 5d. The field distribution shown in FIG. 5d can be regarded on the one hand as a field distribution 202 of the transformed first electric field, wherein the transformation represents the complete projective mapping P; on the other hand, this field distribution can also be regarded as the field distribution 204 of the second electric field on the detection plane 131.

The field distribution 204 of the second electric field on the detection plane 131 can however, in the original coordinate system with the components x1 and x2, also be described in a transformed coordinate system with the components y1 and y2.

It can be seen in FIG. 5d that the reticle, which originally described the first electric field at location $x_0$, now describes the second electric field at the location $y_0$. Here, the first coordinate system with the components x1 and x2 and the second coordinate system with the components y1 and y2 are converted into each other by a projective mapping P or its inverse projective mapping $P^{-1}$. As the projective mapping P is invention-related bijective, there is always an inverse projective mapping $P^{-1}$ to a project mapping P.

Figure 6:
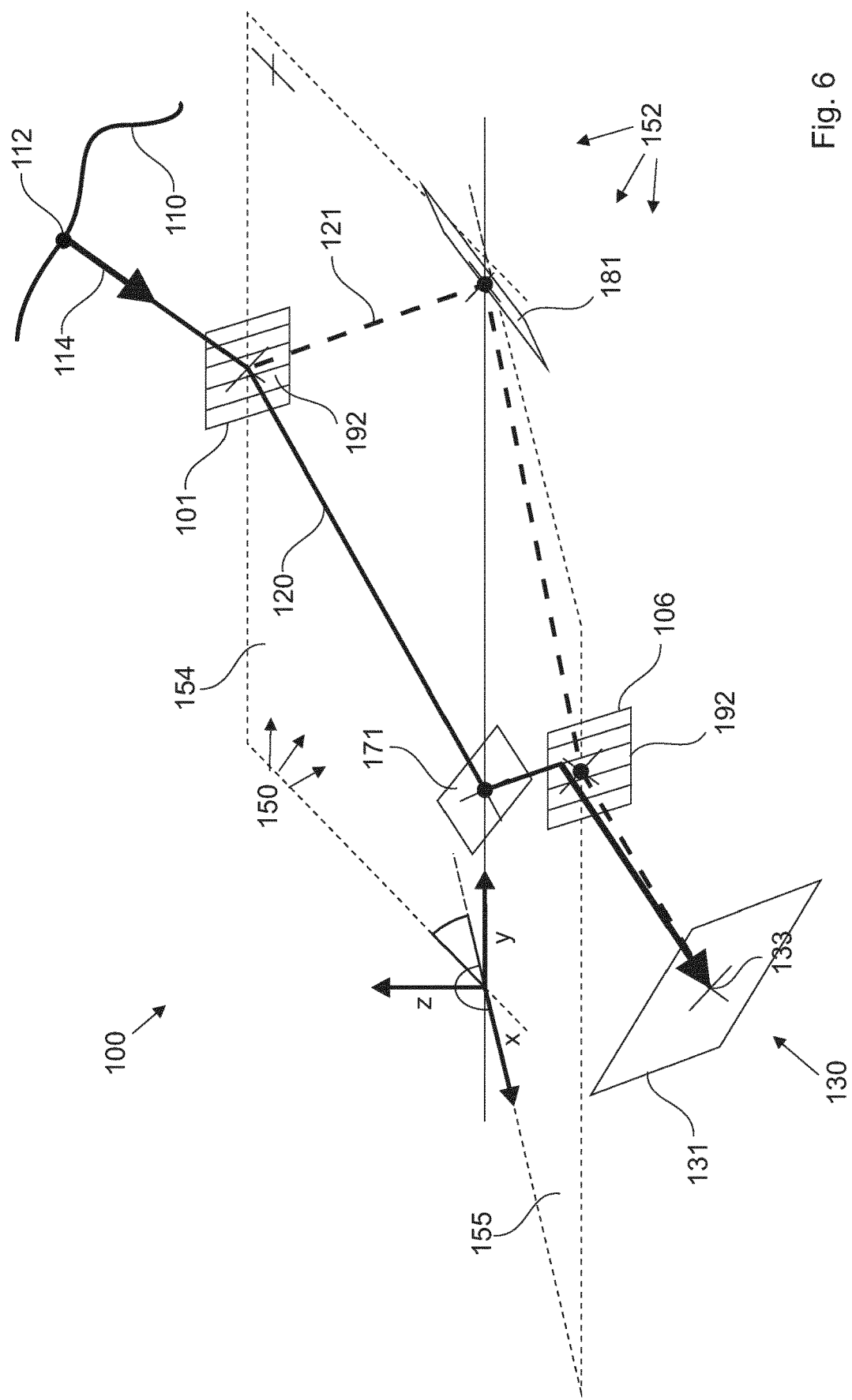
FIG. 6 shows a schematic of an embodiment of an invention-related interferometer in which both the beam splitter and the overlap device each have a diffraction grating.

FIG. 6 shows a schematic of an embodiment of an invention-related interferometer in which both the beam splitter and the overlap device each has a diffraction grating. The embodiment of FIG. 6 resembles the representation of the embodiment in FIG. 1. It differs from FIG. 1 however in that both the beam splitter 101 and the overlap device 106 have diffraction gratings 192.

In addition, the first interferometer arm 150 has only a first ray deflection element 171, but no second ray deflection element 172. Equally, the second interferometer arm 152 has only a first ray deflection element 181, but no second ray deflection element 182.

Here, the diffraction grating 192 of the beam splitter 101 can be used in such a way that the incident ray in the first and minus-first order is diffracted, and the zero order practically suppressed or not used. It is preferred here when the intensities in the first and minus-first order are approximately equal.

In addition, the diffraction grating 192 of the overlap device 106 can be used in reverse to the normal ray guidance. Here, for example, the first and minus-first diffraction order can be used as the two rays to be combined and a commonly incident ray as the exiting combined ray. Here however, possible differences between the beam splitter 101 and the overlap device 106 are to be taken into consideration.

In the embodiment of FIG. 6, the incident plane 154 and the exit plane 155 intersect in a straight line which corresponds to the y-axis.

The total number of ray deflections in the embodiment of FIG. 6 is also six, as in the embodiment of FIG. 1. It is to be noted in this respect that two ray deflections correspond to each diffraction grating 192, which amounts to four ray deflections in total. In addition, there is still a ray deflection at the first ray deflection element 171 in each case in the first interferometer arm 150 and at the first ray deflection element 181 in the second interferometer arm 152.

Figure 7:
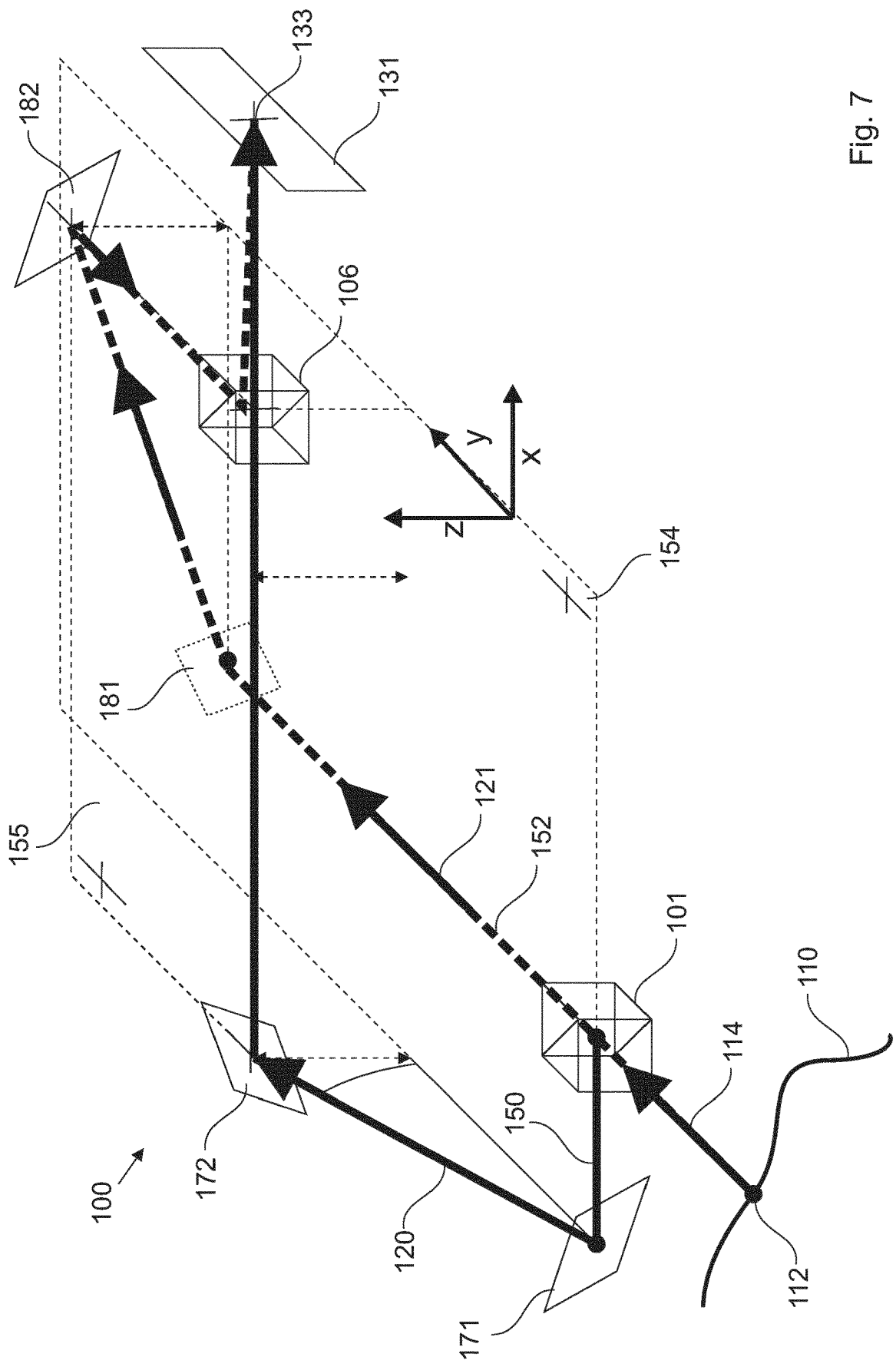
FIG. 7 shows a schematic of an embodiment of an invention-related interferometer in which the incident plane and the exit plane are not identical, but parallel to each other.

FIG. 7 shows a schematic of an embodiment of the invention-related interferometer, for which the incident plane 154 and the exit plane 155 are not identical, but are parallel to each other.

The special point about the embodiment of FIG. 7, is that the incident plane 154 and the exit plane 155 do not intersect; they are however also not identical. This condition can only be fulfilled when these are parallel to each other, which is the case here.

The embodiment of FIG. 7 has an object 110 with an object point 112 in the bottom left corner, from which a central ray 114 strikes a beam splitter cube acting as beam splitter 101. While the second central ray 121 from the beam splitter 101 is not deflected and enters the second interferometer arm 152, the first central ray 120 is deflected to the left in the direction of the first ray deflection element 171 in the first interferometer arm 150.

The incident plane 154 is spanned by the first central ray 120 and the second central ray 121 directly after the beam splitter 101.

The first central ray 120 is deflected in the first interferometer arm 150 by the first ray deflection element 171 out of the incident plane 154 upwards in the direction of the second ray deflection element 172 in the first interferometer arm 150. The center of the second ray deflection element 172 is located in the exit plane 155. The first central ray 120 is then deflected by the second ray deflection element 172 in the direction of overlap device 106 acting as beam splitter, through which it however passes undeflected to then strike the detection plane 131.

The second central ray 121 strikes in the second interferometer arm 152 of beam splitter 101 coming firstly onto the first ray deflection element 181 and then on the second ray deflection element 182, after which it is reflected from this onto the overlap device 106. While the first ray deflecting element 181 lies in the incident plane 154, the second ray deflection element 182 is located in the exit plane 155. After the overlap device 106, the second central ray 121 is deflected onto the detection plane 131.

In the embodiment of FIG. 7, the exit plane 155 is located above the incident plane 154. This is indicated by dashed arrows, which can be easily recognized, especially at the first central ray 120 between the second ray deflection element 172 and the overlap device 106.

In addition, also the embodiment of FIG. 7 has a total of six ray deflections for both interferometer arms 150, 152. Here, the two beam splitter cubes of the beam splitter 101 and of the overlap device 106 each have one ray deflection. The remaining four ray deflections are achieved by the first ray deflection element 171 and the second ray deflection element 172 in the first interferometer arm 150 and the first ray deflection element 181 and the second ray deflection element 182 in the second interferometer arm 152.

Figure 8:
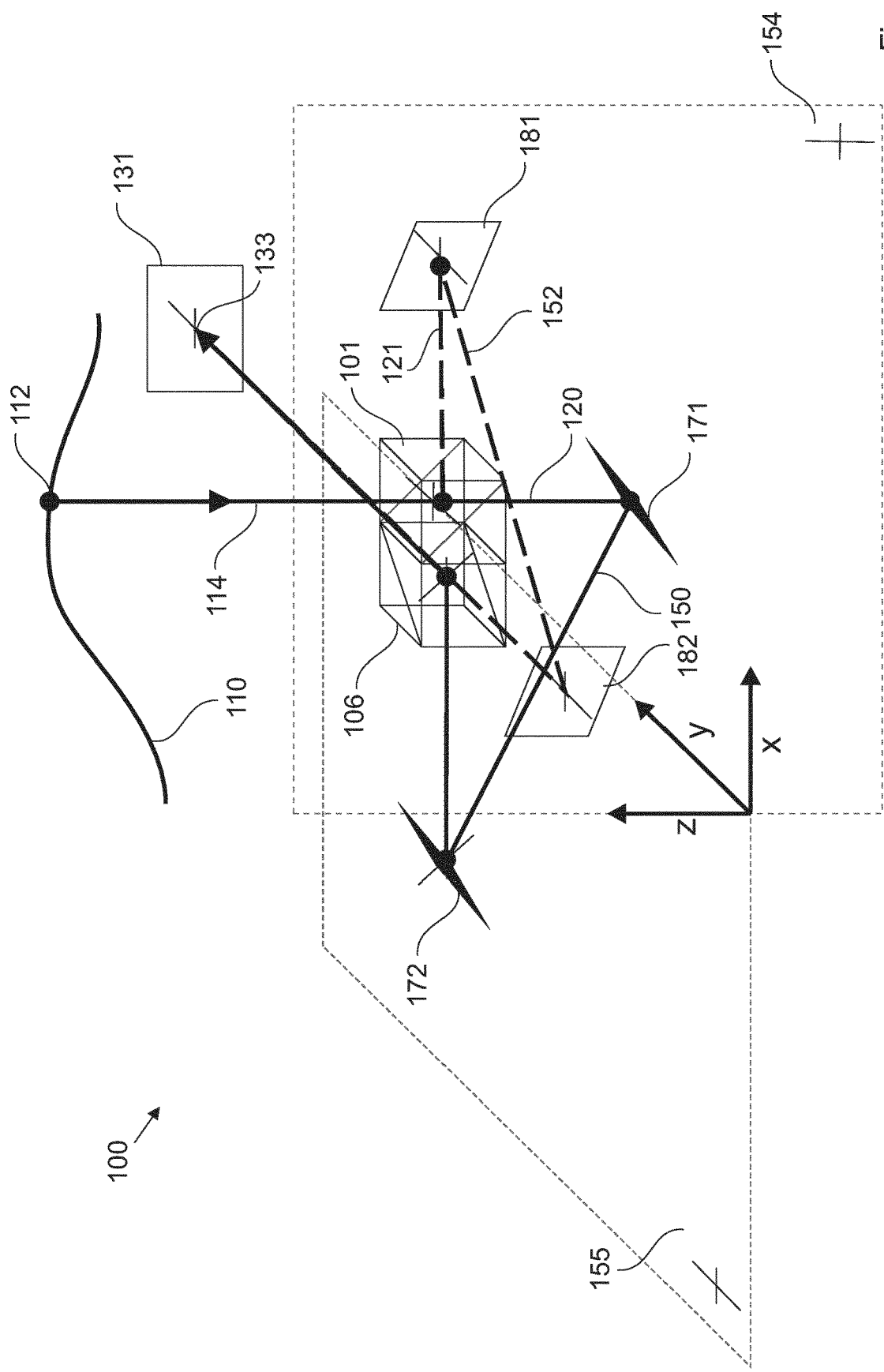
FIG. 8 shows the schematic of an embodiment of an invention-related interferometer, which can be built compactly and in which the incident plane and the exit plane are perpendicular to each other.

FIG. 8 shows the schematic of an embodiment of an invention-related interferometer, which can be built compactly and in which the incident plane and the exit plane are perpendicular to each other.

The embodiment of FIG. 8 has a central object point in the field of view.

The embodiment of FIG. 8 has an object 110 at the upper edge with an object point 112, from which a central ray 114 strikes a beam splitter 101 in the form of a beam splitter cube. Here, the central ray 114 runs along the negative z-axis.

While the second central ray 121 running along the x-axis from the beam splitter 101 is deflected, the first central ray 120 is not deflected and runs further along with the negative z-axis downwards in the direction of the first ray deflection element 171 in the first interferometer arm 150.

As the incident plane 154 is spanned by the first central ray 120 and the second central ray 121 directly after the beam splitter 101, the incident plane 154 in the x-z plane, is therefore perpendicular to the x-y plane.

In the first interferometer arm 150, the first central ray 120 runs—after the reflection from the first ray deflection element 171—along the positive z-axis and the negative x-axis to then strike the second ray deflection element 172, which stands in the y-z plane at the same position as the first ray deflection element 181 in the second interferometer arm 152.

After the reflection at the second ray deflection element 172, the first central ray 120 strikes an overlap device 106 acting as a beam splitter, which is located next to beam splitter cube of the beam splitter 101. The first central ray 120 is deflected by the overlap device 106 onto the detection plane 131 in the direction of the positive y-axis.

The second central ray 121 is deflected after the beam splitter 101 along the x-axis onto the first ray deflection element 181 of the second interferometer arm 152. After the reflection at the first ray deflection element 181, the second central ray 121 runs along the negative y-axis and the negative x-axis till it strikes the second ray deflection element 182 whose center is located in the x-z-plane at the same position as the central image point 133 of the detection plane 131. After the reflection at the second ray deflection element 182, the second central ray 121 is deflected onto the overlap device 106, through which it passes undeflected to strike the detection plane 131.

The following distances on the central ray relative to the central object point are the same for this object point. The distance from beam splitter 101 to the first ray deflection element 181 is the same as the distance from the second ray deflection element 172 to the overlap device 106. The distances between the first ray deflection elements 171, 181 and the respective second ray deflection elements 172, 182 are the same. The distance between beam splitter 101 and the first ray deflection element 171 is the same as the distance between the second ray deflection element 182 and the overlap device 106.

The exit plane 155 is spanned by the first central ray 120 and the second central ray 121 directly before the overlap device 106 and lies in the x-y plane. With that, the exit plane 155 stands perpendicular to the incident plane 154.

The embodiment of FIG. 8 also has a total of six ray deflections for both interferometer arms 150, 152. Here also, the two beam splitter cubes of the beam splitter 101 and of the overlap device 106 have one ray deflection each. The remaining four ray deflections are achieved, as in the embodiment of FIG. 7, by the first ray deflection element 171 and the second ray deflection element 172 in the first interferometer arm 150 and the first ray deflection element 181 and the second ray deflection element 182 in the second interferometer arm 152.

FIG. 9 shows a schematic of an embodiment of an invention-related interferometer with a monolithic structure.

As the existing embodiment of FIG. 9 with its monolithic optics is difficult to represent three-dimensionally, a section in the x-y plane is shown in FIG. 9a and a section perpendicular to it in the x-z plane is shown in FIG. 9b.

It is to be noted here that the arrangement of the beam splitter cube of the beam splitter 101 and the overlap device 106 and the arrangement of the first central ray 120 and of the second central ray 121 are exactly as in the embodiment of FIG. 8. To understand how the embodiment of FIG. 9 is constructed, it helps to recall the embodiment of FIG. 8.

The beam splitter cube of the beam splitter 101 and the overlap device 106 are indicated by dashed lines, wherein the limiting surfaces are integrated into the monolithic optics; they have however no optical effect. Optically effective are the partially mirrored inner surfaces 212 and 214 of the monolithic optics 210.

Therefore, in the embodiment of FIG. 9, just as in the external form of FIG. 8, the incident plane 154 is in the x-z plane and the exit plane 155 is in the x-y plane perpendicular to it.

For reasons of clarity, the object 110 with the object point 112 are not drawn in FIG. 9. The central ray 114 emanating from the object point 112 can however be identified, which strikes the beam splitter 101 that is implemented as a beam splitter cube.

The first central ray 120 results from the central ray 114, in that it runs without deflection through the beam splitter 101 and along the negative z-axis (see FIG. 9b), till it is reflected at a part of the monolithic optics 210, which is designated as the first ray deflection element 171. After the reflection, the first central ray 120 in turn strikes a part of the monolithic optics 210, which is designated as the second ray deflection element 172. On this path, the first central ray 120 passes through the partially mirrored inner surface 214. From there, the first centra ray 120 is deflected to the overlap device 106 where it is deflected in the direction of the detection plane 131 (see FIG. 9a).

The second central ray 121 results from the central ray 114 by reflection at the beam splitter 101 in the direction of a part of the monolithic optics 210, which is designated as first ray deflection element 181 of the second interferometer arm 152 (see FIG. 9a). On this path, the second central ray 121 passes through the partially mirrored inner surface 212. From there, the second central ray 121 is reflected to another part of the monolithic optics 210, which is designated as second ray deflection element 182. From there, in turn, the second central ray 121 is reflected to the overlap device 106, where it passes through, undeflected, to strike the detection plane 131.

The ray blocker 216 prevents light from the first interferometer arm 150 reaching the second interferometer arm 152.

LIST OF REFERENCE NUMBERS

100 Three-dimensional interferometer
101 Beam splitter
106 Overlap device
110 Object
112 Object point
114 Central ray
115 Light ray of the beam 140, which is not the central ray 114
116 Third light ray
117 Fourth light ray
120 First central ray
121 Second central ray
125 First light ray
126 Second light ray
130 Detector
131 Detection plane
132 Interference area
133 Central image point
134 Image point
135 Image point which is not image point 133
150 First interferometer arm
152 Second interferometer arm
154 Incident plane
155 Exit plane
171 First ray deflection element in the first interferometer arm
172 Second ray deflection element in the first interferometer arm
181 First ray deflection element in the second interferometer arm
182 Second ray deflection element in the second interferometer arm
192 Diffraction grating
200 Field distribution of the first electric field on the detection plane
202 Field distribution of the transformed first electric field on the detection plane
204 Field distribution of the second electric field on the detection plane
210 Monolithic optics
212 Partially mirrored inner surface
214 Partially mirrored inner surface
216 Ray blocker
$E1_{ij}$ First electric field
$E2_{ij}$ Second electric field
IF Interference term
(i, j) Pixel grid
(m, n) Pixel grid
$\overline{E2}_{ij}$ Complex conjugated number of the complex second electric field $E2_{ij}$
$\Psi_{ij}$ Phase difference
$\Phi 1_{ij}$ Phase of the first electric field
$\Phi 2_{ij}$ Phase of the second electric field
U Propagation matrix
$U_{mn,ij}$ Elements of the propagation matrix U

The invention claimed is:

1. An interferometer for measuring a light field produced by an object, the interferometer comprising:
   a first interferometer arm arranged to pass through a first beam;
   a second interferometer arm arranged to pass through a second beam;
   a beam splitter arranged between an object point of the object and both of the first interferometer arm and the second interferometer arm, wherein the beam splitter is configured to split a light beam emanating from the object point into the first light beam and the second light beam;

a detection surface located after the first interferometer arm and the second interferometer arm, wherein the detection surface is arranged so that the first light beam and the second light beam are brought to interference on an interference area of the detection surface; and an overlap device located between the detection surface and both of the first and second interferometer arms;

wherein the beam splitter, the first interferometer arm, the second interferometer arm, the overlap device, and the detection plane are configured such that:

there is an initial central ray emanating from the object point, wherein the initial central ray is divided at the beam splitter into a first central ray and a second central ray;

the initial central ray is part of the light beam, the first central ray is part of the first light beam and the second central ray is part of the second light beam;

the first central ray and the second central ray overlap on the detection plane in the interference area in a central image point;

for each light ray that emanates from the object point of the object and is part of the light beam, but is not the central ray, the beam splitter splits each light ray that is not the central ray into a first light ray and a second light ray, wherein each first light ray passes through the first interferometer arm and each second light ray passes through the second interferometer arm, and wherein corresponding first and second light rays strike the detection surface at different points;

for each image point of the interference area that is not the central image point, there is a third light ray and a fourth light ray, each of which are not the central ray;

the third light ray emanates from the object point, passes through the first interferometer arm and the image point, and strikes the detection plane;

the fourth light ray emanates from the object point passes through the second interferometer arm, and overlaps with the third light ray at the image point on the detection surface; and the third light ray and the fourth light ray are part of the light beam before the beam splitter.

2. The interferometer of claim 1, also comprising:

an evaluation unit configured to measure at least one of a phase difference between two interfering light rays or a phase of a light ray striking at least one point of the interference area of the detection surface.

3. The interferometer of claim 1, further comprising a detector configured to detect light impinging on the detection surface.

4. The interferometer of claim 1, wherein at least one of the first interferometer arm or the second interferometer arm comprise at least one ray deflection element.

5. The interferometer of claim 1, wherein the interferometer is configured so that a sum of ray deflections for a fifth light ray that is the central ray before the beam splitter and is the first central ray after the beam splitter, wherein the fifth light ray is only considered between a point immediately before the beam splitter and immediately after the overlap device, and for a sixth light ray that is the central ray before the beam splitter and is the second central ray after the beam splitter, wherein the sixth ray is only considered between a point immediately before the beam splitter and immediately after the overlap device, is equal to one of 5, 6 or 7.

6. The interferometer of claim 1, wherein an incident plane, which is defined by the first central ray and the second central ray directly after the beam splitter, and an exit plane which is defined by the first central ray and the second central ray directly before the overlap device are unequal.

7. The interferometer of claim 1, wherein at least one of the first interferometer arm (150) or the second interferometer arm includes a device for changing an optical path of the corresponding interferometer arm.

8. The interferometer of claim 1, further comprising a device for at least one of the relative displacement, relative stretching, relative tipping or relative rotation of an existing first light field on the detection surface that originates from the first light beam and of an existing, second light field on the detection surface that originates from the second light beam.

9. The interferometer of claim 1, wherein the interferometer comprises at least a portion of a holographic camera.

10. A method of using the interferometer of claim 1 for determining a phase difference $\Psi_{ij}$ for at least one image point of a pixel grid of a detection surface in an interference area between a first electric field $E1_{ij}$ and a second electric field $E2_{ij}$, which interfere at the at least one image point, wherein the first electric field originates from a first interference arm and the second electric field $E2_{ij}$ originates from a second interference arm.

11. A method of using the interferometer of claim 1 for determining a phase of an electric field ($E1_{ij}, E2_{ij}$) in a part of an interference area on a detection surface of a three-dimensional interferometer, the method comprising:

for a part of the interference area, determining at least one of an intensity or an absolute value of a first electric field ($E1_{ij}$), which originates from a first interference arm, and a second electric field ($E2_{ij}$) which originates from a second interference arm;

for the part of the interference area, determining an interference term (IF) according to the equation:

$$IF_{ij} = |E1_{ij}| \cdot |E2_{ij}| \cdot \exp(i \cdot \Psi ij),$$

wherein $\Psi_{ij}$ is a phase difference between the phase ($\Phi 1_{ij}$) of the first electric field ($E1_{ij}$) and the phase ($\Phi 2_{ij}$) of the second electric field ($E2_{ij}$) that can be determined, especially with the help of the method according to claim 10;

determining a propagation matrix (U), wherein an element of the propagation matrix (U) states how, for a given pixel grid of the interference area, the first electric field $E1_{ij}$ at a pixel with the indices i and j can be transformed into a second electric field $E2_{ij}$ at a pixel with the indices m and n, and for the part of the interference area, solving of the equation $$|E1_{ij}|^2 \cdot \sum_{m,n} \overline{U_{ij,m,n} \cdot E1_{mn}} = 1 F_{ij} \cdot \overline{E1_{ij}}$$

after the complex first electric field ($\overline{E1_{ij}}$).

12. A non-transitory computer-readable medium storing a computer program that, when executed by a computer, performs the method according to claim 10.

13. A non-transitory computer-readable medium storing a computer program that, when executed by a computer, performs the method according to claim 11.

* * * * *